United States Patent
Co et al.

(10) Patent No.: US 9,904,427 B1
(45) Date of Patent: Feb. 27, 2018

(54) UNDERWATER NON-CONDUCTIVE TOUCH TRACKING

(71) Applicant: PARADE TECHNOLOGIES, LTD., Santa Clara, CA (US)

(72) Inventors: Ryan Lester Tan Co, Inagi (JP); Naoki Hirakawa, Kawasaki (JP)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 4 days.

(21) Appl. No.: 15/013,958

(22) Filed: Feb. 2, 2016

(51) Int. Cl.
*G09G 5/00* (2006.01)
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01)

(58) Field of Classification Search
CPC .................. G06F 3/044; G06F 3/0416; G06F 2203/04101
USPC ........................................ 345/174; 178/18.06
See application file for complete search history.

(56) References Cited

U.S. PATENT DOCUMENTS

| 8,982,097 B1* | 3/2015 | Kuzo ..................... G06F 3/0418 345/174 |
| 2015/0378496 A1* | 12/2015 | Vandermeijden ..... G06F 3/0416 345/174 |
| 2016/0291796 A1* | 10/2016 | Ho .......................... G06F 3/044 |

* cited by examiner

*Primary Examiner* — Jennifer Nguyen
(74) *Attorney, Agent, or Firm* — Morgan, Lewis & Bockius LLP

(57) ABSTRACT

The various implementations described herein include systems, methods and/or devices used to enable underwater non-conductive touch tracking. An exemplary method is performed at a touch sensitive device and includes: detecting submersion of a capacitive sense array (CSA), including detecting increased electrode responses from at least a subset of a plurality of sensor electrodes of the CSA that exceed a predetermined electrode response criterion. The method further includes: (1) identifying one or more normalization factors for the CSA based on the detected increased electrode responses from the subset of the plurality of sensor electrodes, and (2) normalizing, using the one or more normalization factors, the CSA to form a substantially uniform baseline response across the CSA. The method further includes during the submersion, and subsequent to the normalizing, identifying one or more subsequent electrode responses that differ from the substantially uniform baseline response by at least a threshold amount.

22 Claims, 17 Drawing Sheets

| 10 | 10 | 10 | 10 | 10 | 8 | 8 | 8 | 8 | 10 | 10 | 10 | 10 | 10 |
|----|----|----|----|----|----|----|----|----|----|----|----|----|----|
| 0 | 0 | 1 | 0 | 0 | 1 | 0 | 0 | -1 | 0 | 0 | 1 | 0 | 1 | 10 |
| 0 | 0 | 0 | 0 | 0 | 0 | 0 | 0 | 0 | 0 | 0 | 0 | 0 | 0 | 10 |
| 1 | 0 | 0 | 1 | 0 | -4 | -5 | -5 | -4 | -1 | 0 | 0 | 0 | 0 | 8 |
| 0 | 0 | 0 | 0 | 0 | -5 | -6 | -6 | -5 | 0 | 0 | 0 | 0 | 0 | 8 |
| 0 | 0 | 0 | 0 | 0 | -5 | -6 | -6 | -5 | 0 | 0 | 0 | 0 | 0 | 8 |
| 0 | 1 | 0 | 0 | -1 | -4 | -5 | -5 | -4 | 0 | 1 | 0 | 1 | 0 | 8 |
| 0 | 1 | 0 | 0 | -1 | 0 | 0 | -1 | 0 | 0 | 1 | 0 | 1 | 0 | 10 |
| 0 | 0 | 0 | 0 | 0 | 0 | 0 | 0 | 0 | 0 | 0 | 0 | 0 | 0 | 10 |

At an electronic device having a processor and a capacitive sense array that includes a plurality of sensor electrodes: ~602

Detecting submersion of the capacitive sense array, including detecting increased electrode responses from at least a subset of the plurality of sensor electrodes that exceed a predetermined electrode response criterion ~604

Detecting the increased electrode responses from the subset of the plurality of sensor electrodes that exceed the predetermined electrode response criterion comprises detecting a predefined number of sensor electrodes of the plurality of sensor electrodes having electrode responses that exceed the predetermined electrode response criterion ~606

Positioning one or more capacitance sensors at different critical detection regions of the capacitive sense array ~608

Detecting the increased electrode responses from the subset of the plurality of sensor electrodes that exceed the predetermined electrode response criterion comprises detecting a substantially uniform electrode response across the plurality of sensor electrodes ~610

The predetermined electrode response criterion exceeds an electrode response associated with a non-submerged touch (e.g., a normal out-of-water touch) ~612

The predetermined electrode response criterion is a first predetermined electrode response criterion associated with self-capacitance measurements, and when detecting submersion of the capacitive sense array further includes detecting increased mutual capacitance measurements from at least a subset of the plurality of sensor electrodes that exceed a second predetermined electrode response criterion ~614

UNDERWATER NON-CONDUCTIVE TOUCH TRACKING

TECHNICAL FIELD

The disclosed implementations relate generally to touch-sensitive displays, and in particular, to processing non-conductive touch (e.g., an underwater touch) on a touch-sensitive display.

BACKGROUND

Computing devices, such as notebook computers, personal digital assistants, mobile communication devices, portable entertainment devices (e.g., handheld video game devices, multimedia players) may include user interface devices that facilitate interaction between a user and the computing device.

One type of user interface device that has become more common operates by way of capacitance sensing. A capacitance sensing system may include a touch screen, touch-sensor pad, a touch-sensor slider, or touch-sensor buttons, and may include an array of one or more capacitive sensor elements (also referred to as sensor electrodes). Capacitive sensing typically involves measuring, through sensor signals (e.g., increase electrode responses), a change in capacitance associated with the capacitive sensor elements to determine a presence of a conductive object relative to the capacitive sensor elements. However, a non-conductive object is difficult to detect and process, particularly when the non-conductive object that is underwater. Therefore a need exists for effective underwater non-conductive touch detection and tracking.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable underwater non-conductive touch tracking.

(A1) More specifically, some implementations include a method for detecting submersion of a capacitive sense array (e.g., at an electronic device having a processor and a capacitive sense array that includes a plurality of sensor electrodes). Detecting submersion of the capacitive sense array includes detecting increased electrode responses from at least a subset of the plurality of sensor electrodes that exceed a predetermined electrode response criterion. In response to detecting the submersion of the capacitive sense array, the method further includes (1) identifying one or more normalization factors for the capacitive sense array based on the detected increased electrode responses from the subset of the plurality of sensor electrodes, and (2) normalizing, using the one or more normalization factors, the capacitive sense array to form a substantially uniform baseline response across the capacitive sense array. Further, while the capacitive sense array is submerged and subsequent to the normalizing, the method includes identifying one or more subsequent electrode responses that differ from the substantially uniform baseline response by at least a threshold amount. In some implementations, the one or more subsequent electrode responses result from a non-conductive touch (e.g., a gloved finger of a diver).

(A2) In some implementations of the method of A1, the method further includes, while the capacitive sense array is submerged and subsequent to the normalizing, inverting the identified one or more subsequent electrode responses such that negative electrode responses are inverted into positive electrode responses relative to the normalized uniform baseline response and vice-versa.

(A3) In some implementations of the method of any of A1-A2, the detecting of increased electrode responses from at least the subset of the plurality of sensor electrodes that exceed (i.e., satisfies) the predetermined electrode response criterion includes detecting a predefined number of electrodes (e.g., a threshold number of sensor electrodes) of the plurality of sensor electrodes having electrode responses that exceed the predetermined electrode response criterion (e.g., each sensor electrode from the subset of the plurality of sensor electrodes has an electrode response that exceeds the predetermined electrode response criterion). In some implementations, the subset of the plurality of sensor electrodes satisfies the predefined number of electrodes.

(A4) In some implementations of the method of any of A1-A3, the method further includes positioning one or more capacitance sensors (e.g., one or more self-capacitance sensor or one or more mutual-capacitance sensors) at different critical detection regions of the capacitive sense array. For example, in some implementations, the critical detection regions include one or more corners of the capacitive sense array. In some implementations, the one or more capacitance sensors equal the predefined number of electrodes.

(A5) In some implementations of the method of any of A1-A4, the detecting of increased electrode responses from the subset of the plurality of sensor electrodes that exceed the predetermined electrode response criterion includes detecting a substantially uniform electrode response across the plurality of sensor electrodes. In some implementations, detecting the substantially uniform electrode response across the plurality of sensor electrodes includes detecting the substantially uniform electrode response from each of the plurality of sensor electrodes.

(A6) In some implementations of the method of any of A1-A5, the plurality of sensor electrodes include a first self-capacitance buffer that stores the increased electrode responses from the subset of the plurality of sensor electrodes. The first self-capacitance buffer is configured to track a submersion status of the capacitive sense array after detecting submersion of the capacitive sense array. The plurality of sensor electrodes further include a second self-capacitance buffer that is normalized (using one or more normalization factors) subsequent to detecting submersion of the capacitive sense array. The second self-capacitance buffer is configured to track touches on the capacitive sense array while the capacitive sense array is submerged (i.e., the second self-capacitance buffer compares capacitive events (e.g., gloved touches) with the substantially uniform baseline response).

(A7) In some implementations of the method of any of A1-A6, the predetermined electrode response criterion is a first predetermined electrode response criterion associated with self-capacitance measurements. In other words, the first predetermined electrode response criterion is concerned with self-capacitance measurements that exceed (i.e., satisfy) the first predetermined electrode response criterion. The method further includes detecting increased mutual-capacitance responses from at least a subset of the plurality of sensor electrodes that exceed a second predetermined electrode response criterion. In some implementations, one or more mutual-capacitance sensors are positioned at different critical detection regions (e.g., corner regions) of the capacitive sense array to detect the increased mutual-capacitance responses from at least the subset of the plurality of sensor electrodes.

(A8) In some implementations of the method of any of A1-A7, the predetermined electrode response criterion exceeds an electrode response associated with a non-submerged touch. In other words, the processor of the electronic device is able to differentiate electrode responses occurring during submersion of the capacitive sense array from electrode responses associated with non-submerged touches because the electrode responses occurring during submersion of the capacitive sense array are generally greater than the electrode responses associated with the non-submerged touches.

(A9) In some implementations of the method of any of A1-A8, the method further includes, subsequent to detecting submersion of the capacitive sense array, notifying a host system that the capacitive sense array is submerged.

(A10) In some implementations of the method of any of A1-A9, while the capacitive sense array is submerged and subsequent to the normalizing, ignoring subsequent electrode responses that do not differ from the substantially uniform baseline response by at least the threshold amount.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIGS. 4A-4E are conceptual diagrams of sensor electrode responses during a non-conductive touch tracking operation performed on a touch sensitive display, in accordance with some implementations.

FIGS. 6A-6C illustrate a flowchart representation of a method of detecting submersion of a capacitive sense array, in accordance with some implementations.

FIGS. 7A-7F are conceptual diagrams of sensor electrode responses that model a non-conductive touch tracking operation performed on a touch sensitive display of an electronic device, in accordance with some implementations.

Figure 1:
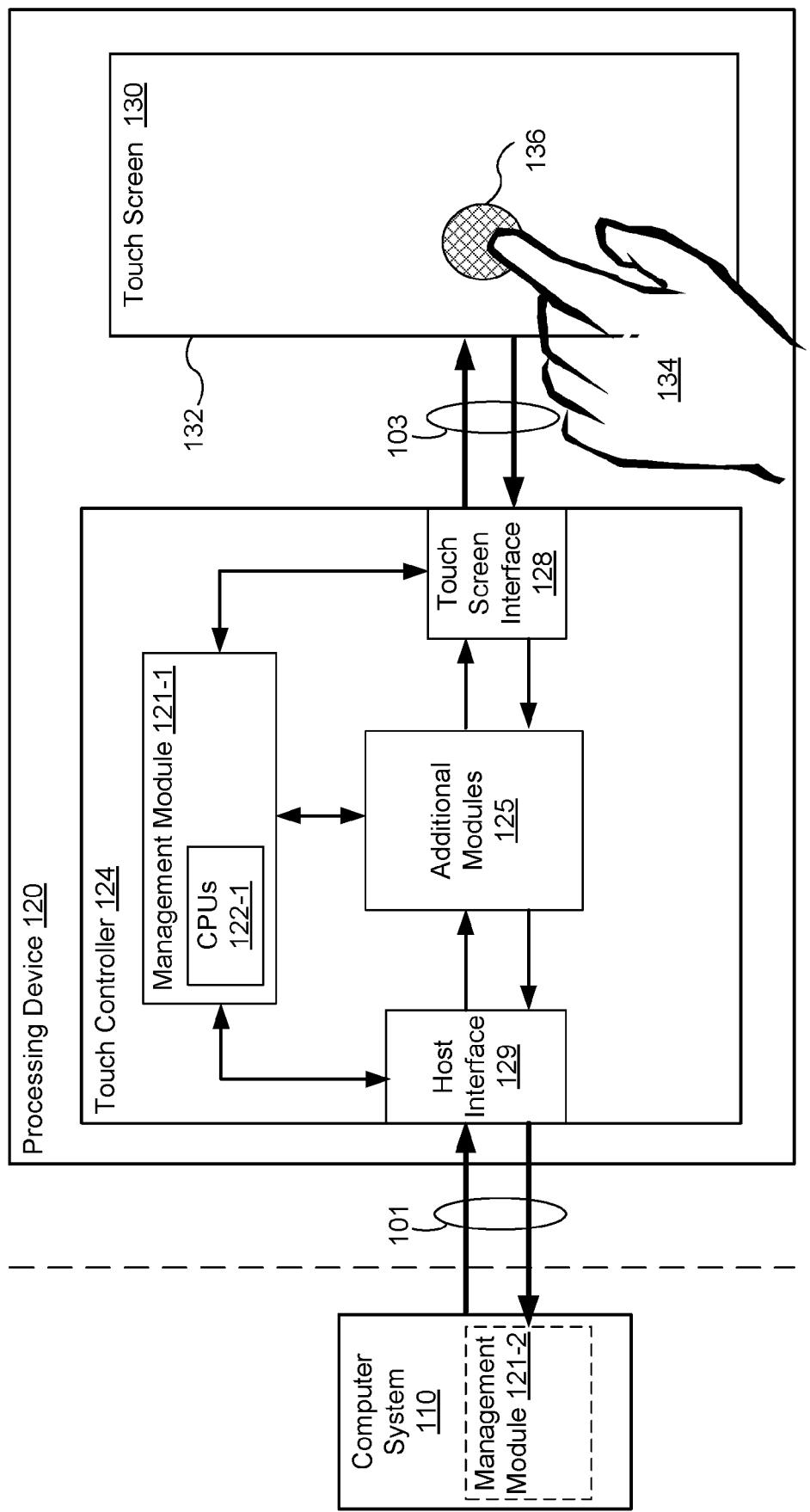
FIG. 1 is a block diagram illustrating a sensing system, in accordance with various implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to enable underwater non-conductive touch tracking on a capacitance sensing system (e.g., a touch screen of an electronic device). Some implementations include systems, methods and/or devices to detect submersion of the capacitance sensing system and transition the capacitance sensing system (e.g., processor of the capacitance sensing system) into an underwater mode that facilitates detecting and processing subsequent non-conductive underwater touches.

Numerous details are described herein in order to provide a thorough understanding of the example implementations illustrated in the accompanying drawings. However, some implementations may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein FIG. 1 is a block diagram illustrating a sensing system 100, in accordance with various implementations. While some example features are illustrated, various other features have not been illustrated for the sake of brevity and so as not to obscure pertinent aspects of the example implementations disclosed herein. To that end, as a non-limiting example, sensing system 100 includes a processing device 120 (also sometimes called a touch sensitive device), which includes a touch controller 124 and a touch screen 130 (also sometimes called a touch sensitive display), and is used in conjunction with or includes a computer system 110 (e.g., a host system or a host computer). In some implementations, the sensing system 100 provides the functionality of a touch screen, a touchpad, a slider, a button, a switch, a level sensor, a proximity sensor, a displacement sensor, a combination thereof, or provide some other functionality based on a detection of a user input.

The computer system 110 is coupled to the touch controller 124 through data connections 101. However, in some implementations the computer system 110 includes the touch controller 124, or a portion of the touch controller 124, as a component and/or as a subsystem. For example, in some implementations, some or all of the functionality of the touch controller 124 is implemented by software executed on the computer system 110. The computer system 110 may be any suitable computer device, such as a laptop computer, a tablet device, a netbook, a personal digital assistant, a mobile phone, a smart phone, a gaming device, a computer server, or any other computing device. The computer system 110 is sometimes called a host or a host system. In some implementations, the computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110.

The touch screen 130 is coupled to the touch controller 124 through the connections 103. In some implementations, however, the touch controller 124 and the touch screen 130 are included in the same device (i.e., an integrated electronic device) as components thereof. Furthermore, in some implementations, the touch controller 124 and the touch screen 130 are embedded in a host device (e.g., computer system 110), such as a mobile device, tablet, other computer or computer controlled device, and the methods described herein are performed, at least in part, by the embedded the touch controller. The touch screen 130 includes a sensing array 132 (e.g., a capacitive sense array) that forms a touch sensitive display. In some implementations, the sensing array 132 includes one or more of light-sensitive elements, light emitting elements, photosensitive elements, pressure sensitive elements, and/or capacitive sensor elements (also referred to as sensor electrodes). The capacitive sensor elements are electrodes of conductive material, such as copper. The sensing array 132 is sensitive to an input object 134 at a location 136 (e.g., a user's finger). In some implementations, the input object 134 is a stylus. In some implementations, the input object 134 is a gloved finger of a user (e.g., the user is in a wetsuit). In some implementations, the user is a human while in other implementations the user is a machine or a mechanism (e.g., an underwater robot).

In some implementations, a touch controller 124 includes a management module 121-1, a host interface 129, a touch screen interface 128, and additional module(s) 125. The touch controller 124 may include various additional features that have not been illustrated for the sake of brevity and so as not to obscure pertinent features of the example implementations disclosed herein, and a different arrangement of features may be possible. The host interface 129 provides an interface to the computer system 110 through the data connections 101. Similarly, the touch screen interface 128 provides an interface to the touch screen 130 though the connections 103.

In some implementations, a management module 121-1 (also referred to as sensing module) includes one or more processing units 122-1 (sometimes herein called CPUs, processors, or hardware processors, and sometimes implemented using microprocessors, microcontrollers, or the like) configured to detect (or process), via the sensing array 132, a presence of one or more input objects 134 proximate or in contact with one or more sensor electrodes of the sensing array 132. In some implementations, the management module 121-1 performs operations (e.g., scan operations) to sense, via the sensing array 132, signals indicating the presence of the one or more input objects (e.g., input object 134). In some implementations, the management module 121-1 detects a pressure applied to the touch screen 130, light (e.g., infrared light) associated with an input object, an image associated with an input object, a capacitance of the sensors and/or a change in capacitance of one or more of the sensor electrodes of the sensing array 132 when an input object is proximate to or in contact with the touch screen 130. The sensing ability of the sensing module 121-1 depends on the type of sensors used in the touch screen 130 (e.g., capacitance sensors such as self-capacitance sensors and/or mutual-capacitance sensors).

In some implementations, the one or more CPUs 122-1 of the management module 121-1 are shared by one or more components within, and in some cases, beyond the function of touch controller 124. The management module 121-1 is coupled to the host interface 129, the additional module(s) 125, and the touch screen interface 128 in order to coordinate the operation of these components. In some implementations, one or more modules of management module 121-1 are implemented in the management module 121-2 of the computer system 110. In some implementations, one or more processors of computer system 110 (not shown) are configured to execute instructions in one or more programs (e.g., in the management module 121-2). The management module 121-2 is coupled to the processing device 120 in order to manage the operation of the processing device 120.

The additional module(s) 125 are coupled to the touch screen interface 128, the host interface 129, and the management module 121-1. As an example, the additional module(s) 125 may include a memory module (e.g., random access memory and/or flash memory). In some implementations, the memory module stores detected electrode responses, electrode response criterions, and normalization factors (discussed in further detail below). In some implementations, the additional module(s) 125 include analog and/or digital general purpose input/output ("GPIO") ports 107. In some implementations, the GPIO ports are coupled to a Programmable Interconnect and Logic ("PIL"), which acts as an interconnect between GPIO ports and a digital block array of the processing device 120. The digital block array may be configurable to implement a variety of digital logic circuits (e.g., DACs, digital filters, or digital control systems) using, in one implementation, configurable user modules ("Ums"). In some implementations, the additional module(s) 125 include an analog block array that is used to implement a variety of analog circuits. The analog block array may also be coupled to the GPIO ports.

Figure 2:
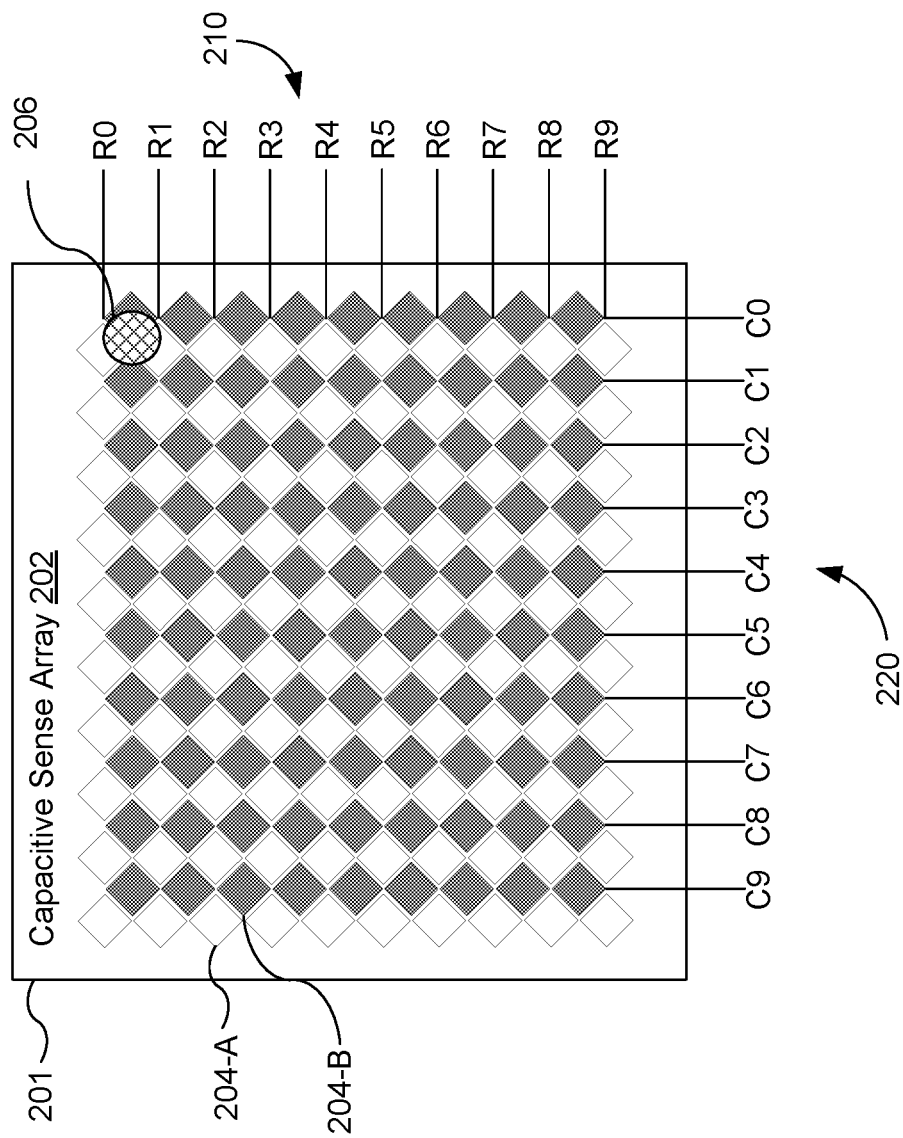
FIG. 2 is a diagram illustrating a touch sensing array including a substrate having a capacitive sense array (i.e., a touch screen), in accordance with various implementations.

FIG. 2 is a diagram illustrating a touch screen 200 (e.g., touch screen 130, FIG. 1) including a substrate 201 (e.g., a dielectric material) having a capacitive sense array 202 (e.g., sensing array 132, FIG. 1), in accordance with various implementations. As shown, FIG. 2 includes rows R0-R9 210 and columns C0-C9 220 of sensor elements (e.g., sensor elements 204-A, 204-B) arranged in an array. The rows R0-R9 210 and the columns C0-C9 220 of sensor elements are coupled with a sensing module (e.g., management module 121-1, FIG. 1). In the underwater touch operations described in more detail below, each of the rows R0-R9 210 and columns C0-C9 220 of sensor elements may operate as both transmit and receive electrodes.

In some implementations, the plurality of sensor electrodes 204 includes both self-capacitance sensors and mutual-capacitance sensors. Within the capacitive sense array 202, each of the rows R0-R9 210 of the sensor elements 204 crosses with each of the columns C0-C9 220 of the sensor elements 204. In this way, galvanic isolation is maintained between the rows R0-R9 210 and the columns C0-C9 220. In some implementations, each of the columns C0-C9 220 are associated with an X-coordinate or range of X-coordinates of the X-Y plane and each of the rows R0-R9 210 are associated with a Y-coordinate or range of Y-coordinates of the X-Y plane. In this way, the sensing module (e.g., management module 121-1, FIG. 1) can determine a location (e.g., touch location 136, FIG. 1) of a touch 206 on the capacitive sense array 202 using X and Y coordinates of the touch 206.

It should be understood that although the plurality of sensor electrodes 204 are shown to be diamond shaped, one or more of the sensor elements 204 may be formed of other shapes (e.g., lines, stripes, bars, triangles, snowflakes, and/or any other shape) and be organized in various other patterns (e.g., intersections, concentric circles, saw tooth pattern, Manhattan pattern, and/or other patterns) without departing from the claimed subject matter. In some implementations, the sensor elements 204 cover all or a portion of the surface area of the substrate 201. In some implementations, the sensor elements 204 and patterns of the sensor elements 204 are formed on or through one or more layers on the substrate 201.

In some implementations, a processing device (e.g., processing device 120, FIG. 1) or one or more components of the processing device (e.g., management module 121-1, FIG. 1) measures capacitance of the plurality of sensor electrodes 204 using self-capacitance sensing. In some implementations, self-capacitance sensing measures added capacitance at each of the plurality of sensor electrodes 204. For example, a user's touch (e.g., a finger) at a specific sensor electrode (e.g., sensor electrode 204-A) increases capacitance at the specific sensor electrode because the finger's capacitance is added to the capacitance of the specific sensor electrode. The processing device detects a "touch" when the added capacitance to the specific sensor electrode exceeds a predefined threshold. In some implementations, the processing device measures capacitance of the plurality of sensor electrodes 204 using mutual-capacitance sensing. In some implementations, mutual-capacitance sensing measures capacitance between a column electrode (e.g., a transmitter (TX) electrode), and a row electrode (e.g., a receiver (RX) electrode). For example, mutual-capacitance sensing measures a change (e.g., a decrease or increase) in capacitance between the column electrode (e.g., sensor electrode 204-A) and the row electrode (e.g., sensor electrode 204-B) resulting from a user's touch (e.g., a finger).

Figure 3:
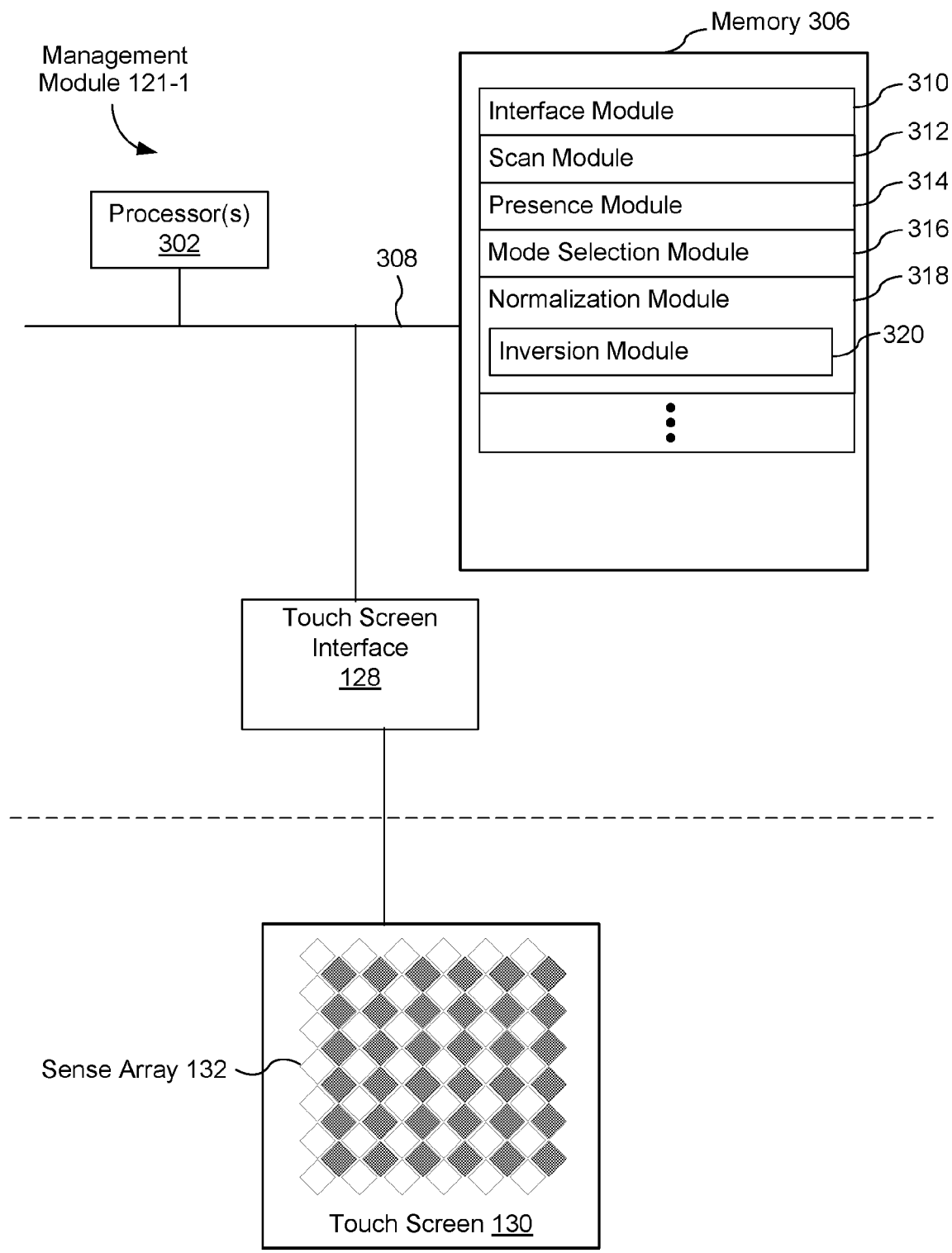
FIG. 3 is a block diagram illustrating an implementation of a management module (e.g., management module 121-1, FIG. 1).

FIG. 3 is a block diagram illustrating an implementation of a management module (e.g., management module 121-1, FIG. 1). The management module 121-1 typically includes one or more processing units 302 (sometimes herein called CPUs, processors, or hardware processors, and sometimes implemented using microprocessors, microcontrollers, or the like) for executing modules, programs and/or instructions stored in memory 306 and thereby performing processing operations, memory 306 and one or more communication buses 308 for interconnecting these components. The communication buses 308 optionally include circuitry (sometimes called a chipset) that interconnects and controls communications between system components. In some implementations, the management module 121-1 is coupled to a touch screen (e.g., touch screen 130, FIG. 1, and in turn, sense array 132) by the communication buses 308 and the touch screen interface 128. In some implementations, the memory 306, or the computer readable storage medium of the memory 306 stores the following modules and data used by the modules:

- an interface module 310 that is used for communicating with other components of the electronic device.
- a scan module 312 that is used to convert sensor signals (e.g., convert analog signals, such as voltage and/or change, into digital signals, or vice versa);
- a presence module 314 that is used to detect presence of a conductive object, or lack of a conductive object;
- a mode selection module 316 that is used to select a mode of operation of the electronic device based on electrode responses from the capacitive sense array (e.g., underwater mode); and
- a normalizing module 318 that is used to normalize electrode responses from the capacitive sense array (i.e., establish a new baseline).

In some implementations, the scan module 312 uses a multiplexer or switch matrix (not shown) to distribute signals to one or more sensor electrodes. In some implementations, the scan module 312 uses the same or a different multiplexer (not shown) to receive current from the one or more sensor electrodes. This configuration allows the scan module 312 to scan all or specific portions of the capacitive sense array. In some implementations, scanning specific portions of the capacitive sense array (e.g., corner portions) consumes less energy compared to scanning the entire capacitive sensor array.

In some implementations, the normalizing module 318 includes an inversion module 320 that is used for inverting capacitance measurements (e.g., electrode responses from interaction between water and the capacitive sense array). In some implementations, the inversion module 320 inverts capacitance measurements after the electronic device transitions to underwater mode (i.e., automatically inverts after detecting submersion). In some implementations, the inversion module 320 inverts capacitance measurements after a normalizing step (e.g., step 512, FIG. 5).

Each of the above identified elements may be stored in one or more of the previously mentioned memory devices that together form the memory 306, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 306 may store a subset of the modules and data structures identified above. Furthermore, the memory 306 may store additional modules and data structures not described above. For example, in some implementations, the memory 306 stores detected electrode responses, electrode response criterions, and normalization factors. In some implementations, the programs, modules, and data structures stored in memory 306, or the computer readable storage medium of the memory 306, provide instructions for implementing respective operations in the methods described below with reference to FIG. 5.

FIGS. 4A-4E are conceptual diagrams of sensor electrode responses during a non-conductive touch tracking operation performed on a touch sensitive display of an electronic device, in accordance with some implementations. More specifically, FIGS. 4A-4E represent how a processing device (e.g., processing device 120, FIG. 1) recognizes submersion of a touch sensitive display (e.g., touch screen 130, FIG. 1), and subsequently processes non-conductive underwater touches performed on the touch sensitivity display. It will be understood that the sensor electrode responses shown in FIGS. 4A-4E are simply representations used to provide context.

Figure 4A:
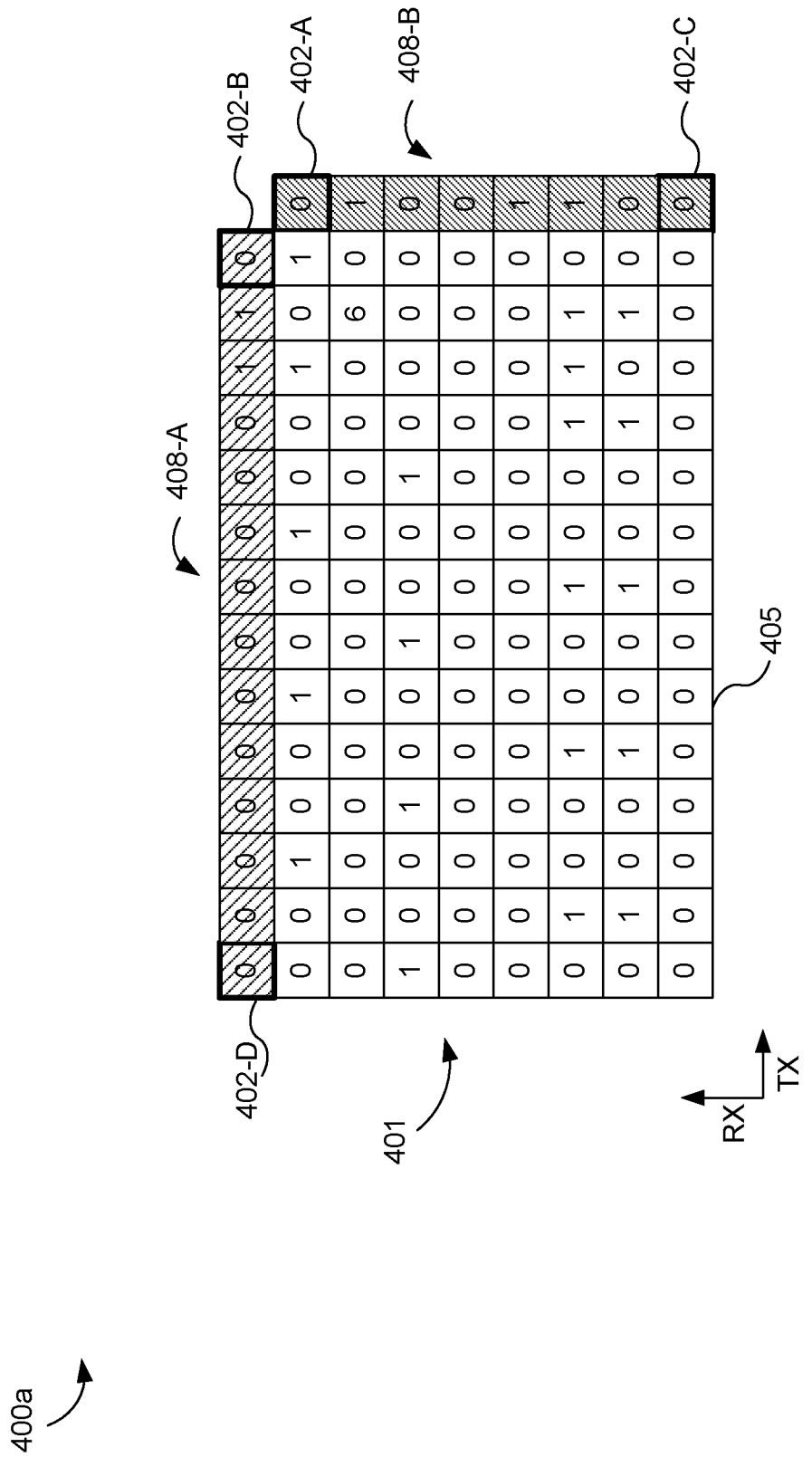

FIG. 4A is a conceptual diagram of the touch sensitive display in an ordinary state 400a, in accordance with some implementations. Ordinary state 400a occurs when the touch sensitive display is subjected to ambient conditions and no part of the touch sensitive display is submerged or in contact with a foreign object. The touch sensitive display (e.g., touch screen 130, FIG. 1) includes a capacitive sense array 401 (e.g., capacitive sense array 202, FIG. 2). The capacitive sense array 401 includes a plurality of sensor electrodes (e.g., sensor electrodes 204-A and 204-B, FIG. 2). In the ordinary state 400a, electrode responses of each of the plurality of sensor electrodes are at an ordinary baseline (i.e., close to zero). In some implementations, the ordinary baseline is a factory calibrated baseline. In some implementations, the ordinary baseline is calibrated upon power up of the device.

In some implementations, the plurality of sensor electrodes includes self-capacitance sensors and/or mutual-capacitance sensors. In some implementations, each sensor electrode of the plurality of sensor electrodes has a respective self-capacitance sensor (e.g., self-capacitance sensors 402-A, 402-B, 402-C, or 402-D). In some implementations, each sensor electrode pair of the plurality of sensor electrodes has a respective mutual-capacitance sensor (e.g., mutual-capacitance sensors 404-A, 404-B, 404-C, or 404-D, FIG. 4B). A respective sensor electrode of the plurality of sensor electrodes is said to be activated (i.e., submerged and thereby not in an ordinary state) when an electrode response (e.g., self-capacitance measurement or mutual-capacitance measurement) of the respective sensor electrode exceeds a predetermined response threshold (also referred to as a predetermined electrode response criterion).

For example, if the predetermined response threshold is say, "5," a sensor electrode (e.g., a sensor electrode coupled with self-capacitance sensor 402-D) is activated when the sensor electrode has a self-capacitance measurement above "5." As shown, the sensor electrode coupled with the self-capacitance sensor 402-D has a self-capacitance measurement of "0," and therefore it is not activated. In some implementations, the plurality of sensor electrodes are coupled with rows and columns of capacitance sensors (e.g., row sensors 408-A (shaded area) and column sensors 408-B (shaded area)). In some implementations, row sensors 408-A operate as transmit (e.g., transmitter (TX) electrodes) and column sensors 408-B operate as receive electrodes (e.g., receiver (RX) electrodes), or vice-versa.

Figures 4B, 4C:
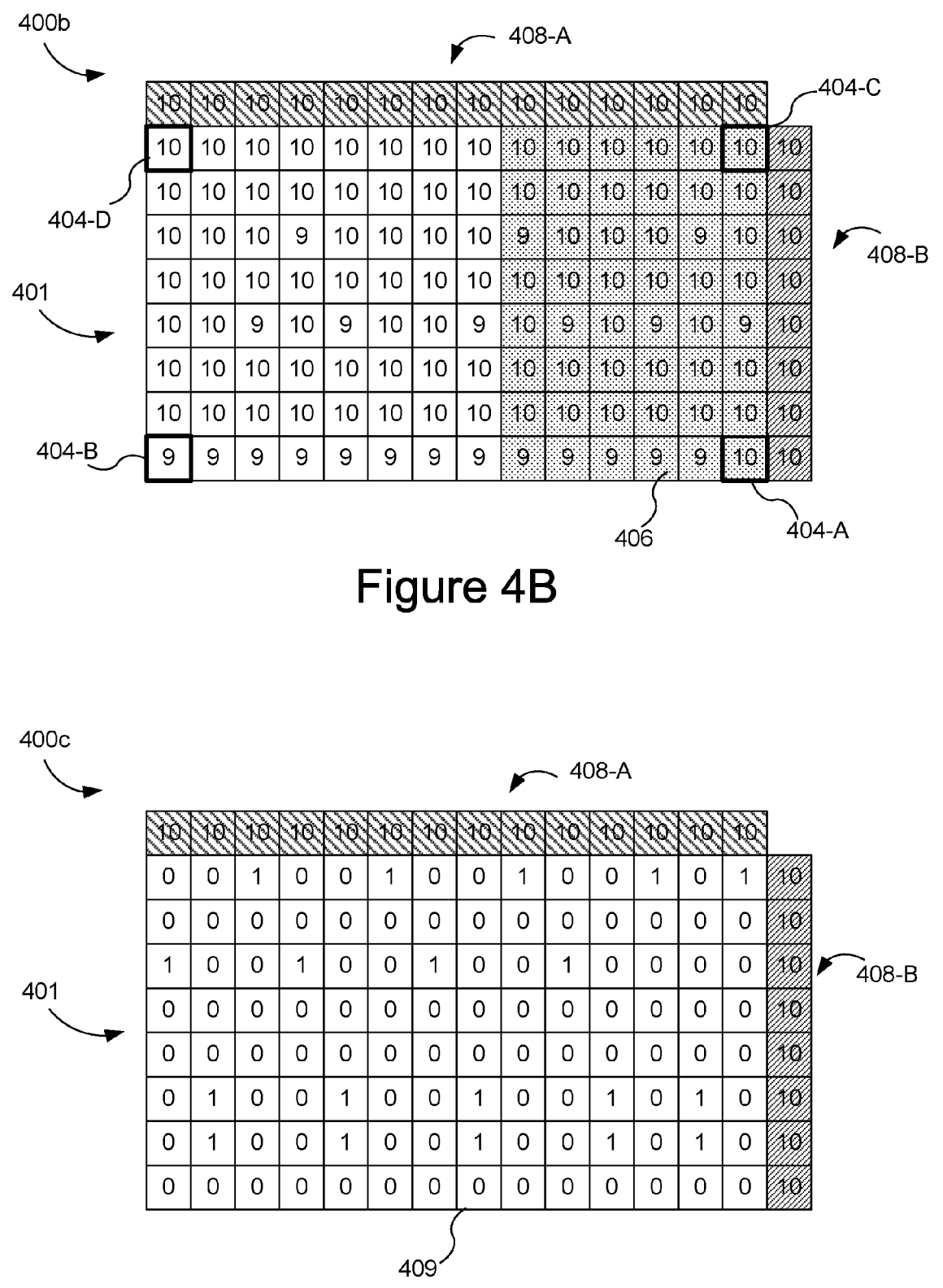
Figure 7A:
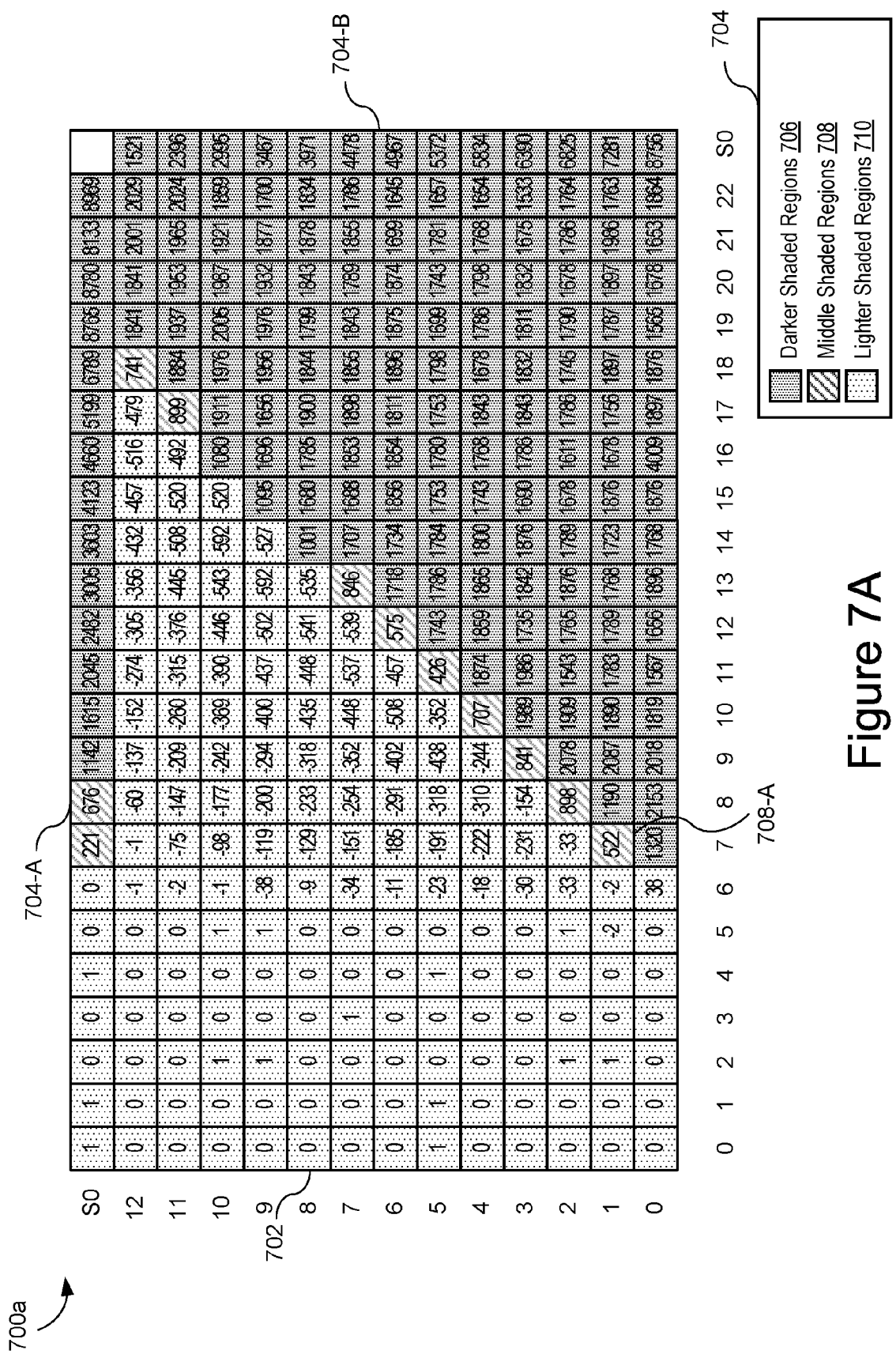
Figure 7B:
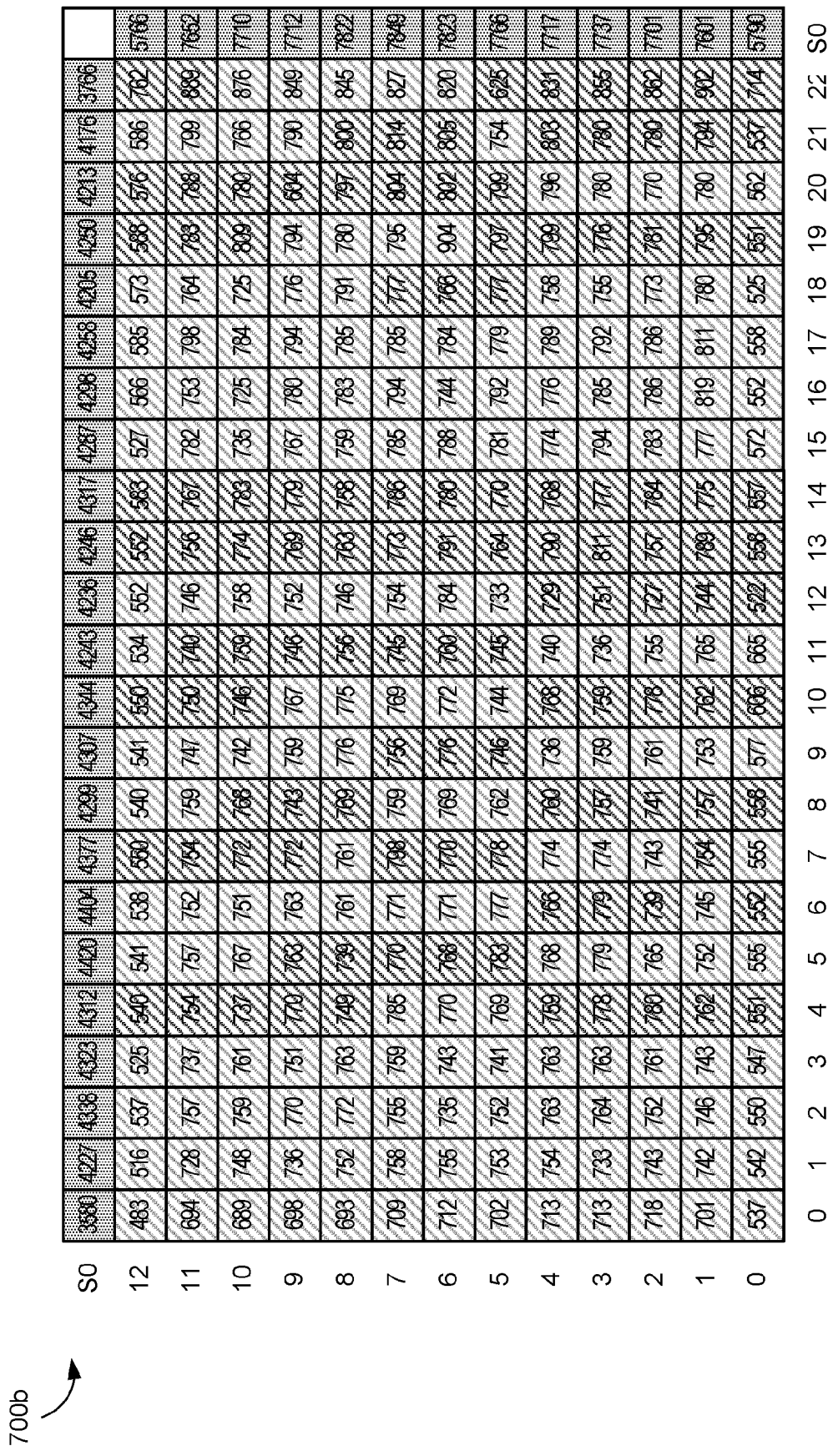

FIG. 4B is a conceptual diagram of the touch sensitive display in a submerged state 400b, in accordance with some implementations. In some implementations, a transition to the submerged state 400b occurs when each sensor electrode in a sensor electrode group making up a portion (e.g., shaded area 406) of the touch sensitive display has an increased electrode response that exceeds a predetermined response threshold. For example, if the predetermined response threshold is say, "5," the sensor electrode group making up the portion (e.g., shaded area 406) is activated if each sensor electrode in the sensor electrode group has an electrode response above "5." As shown, each sensor electrode in the sensor electrode group has an electrode response above "5," and therefore each is activated. Thus, the touch sensitive display is in the submerged state 400b. It should be noted that the sensor electrode group can be numerous sizes (e.g., electrode group includes each electrode of the plurality of the sensor electrodes). FIG. 7A shows model electrode responses during partial submersion of the capacitive sense array 700a and FIG. 7B shows model electrode responses during full submersion of the capacitive sense array 700b.

In some implementations, if the touch sensitive display is in a sleep mode, then a transition to the submerged state 400b will not occur even if the touch sensitive display is fully submerged. Accordingly, transitioning to the submerged state 400b (i.e., detecting submersion of the touch sensitive display) is available after the device is powered up (e.g., woken up).

In some situations, the increased electrode responses caused by submerging the capacitive sense array 401 are substantially greater than an electrode response associated with a normal touch (e.g., a normal out-of-water touch). Accordingly, in some implementations, the processing device differentiates submersion of the capacitive sense array from an out-of-water touch (e.g., a user's hand covers the entire capacitive sense array) by setting the predetermined response threshold to a value that is substantially greater than an electrode response associated with a normal user touch.

Figure 7C:
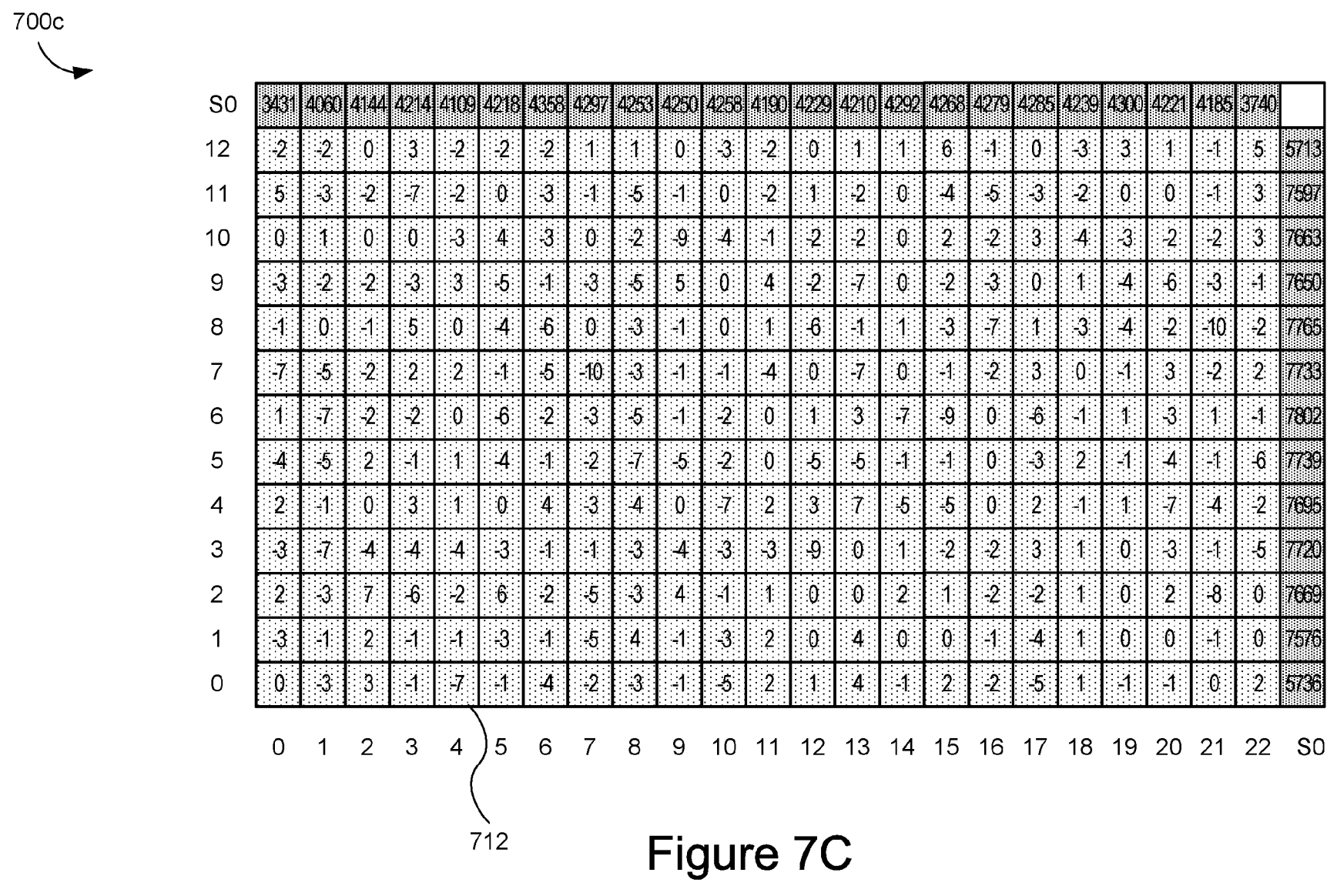

FIG. 4C is a conceptual diagram of the touch sensitive display in a normalized state 400c, in accordance with some implementations. After entering underwater mode (i.e., transitioning to the submerged state 400b), the processing device (e.g., processing device 120, FIG. 1) analyzes the electrode responses of the capacitive sense array 401, and identifies one or more normalizing factors based on the analyzed electrodes responses (normalizing the capacitive sense array is further explained below with reference to FIG. 5). The processing device 120 uses the one or more normalizing factors to normalize the electrode responses 409. In some implementations, normalizing the electrode responses includes establishing a new uniform baseline electrode response across the capacitive sense array 401. As shown in FIG. 4C, the normalized electrode responses 409 are substantially similar to (i.e., mirror) the electrode responses of the ordinary state 400a. However, it should be noted that the row sensors 408-A and column sensors 408-B are not normalized (discussed in further detail below with reference to FIG. 4E). Normalizing the capacitive sense array is further depicted with reference to FIGS. 7B-7C.

In some implementations, the electrode responses are substantially uniform when the touch sensitive display is submerged (e.g., mutual-capacitance measurements (a) electrode responses shown in FIG. 7B). In such a case, a limited number of normalization factors are needed to normalize the electrode responses of the capacitive sense array 401. In some implementations, the electrode responses are not uniform (e.g., as shown in FIG. 4G) and a large number of normalization factors are needed to normalize the electrode responses of the capacitive sense array 401. Once in the normalized state 400c, electrode responses of the plurality of sensor electrodes are substantially uniform (e.g., mutual-capacitance measurements 712 of the capacitive sense array approach zero, FIG. 7C).

Figures 4D, 4E:
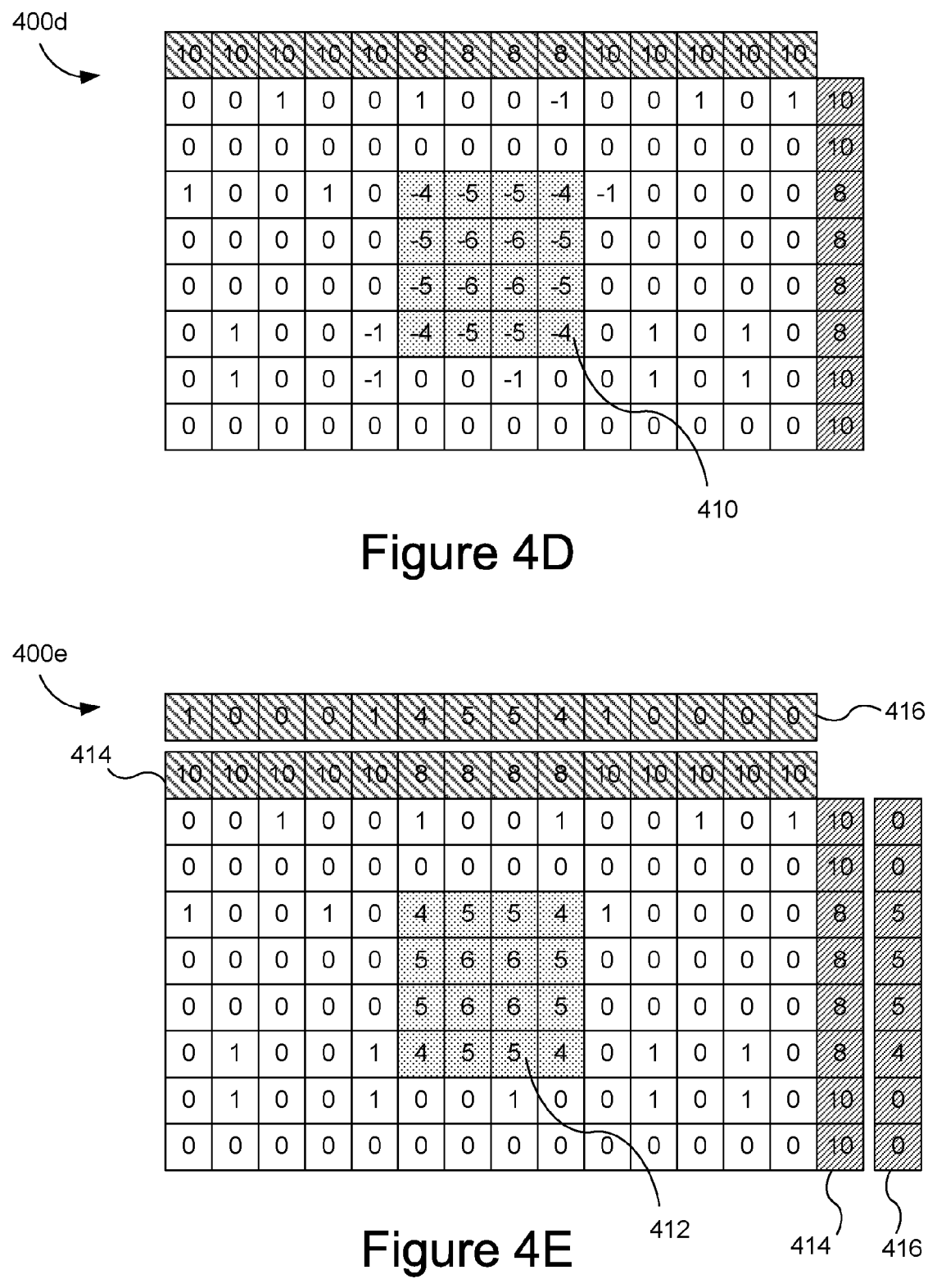

FIG. 4D is a conceptual diagram of the touch sensitive display during a non-conductive touch in the normalized state 400d, in accordance with some implementations. A non-conductive touch is an interaction with the touch sensitive display (e.g., touch screen 130, FIG. 1) that does not substantially alter electrode responses of the touch sensitive display. A shaded area 410 represents a location of the non-conducted touch (e.g., gloved finger of a diver) on the touch sensitive display while in the normalized state 400d. In some implementations, the non-conductive touch substantially reduces electrode responses in the shaded area 410 relative to the uniform normalized baseline. The electrode responses are substantially reduced in the shaded area 410 because the non-conductive touch displaces (i.e., removes) water from the touch sensitive display. The absence of water on the touch sensitive display causes the electrode responses at the contact point to substantially reduce (e.g., results in negative electrode responses).

Figure 7D:
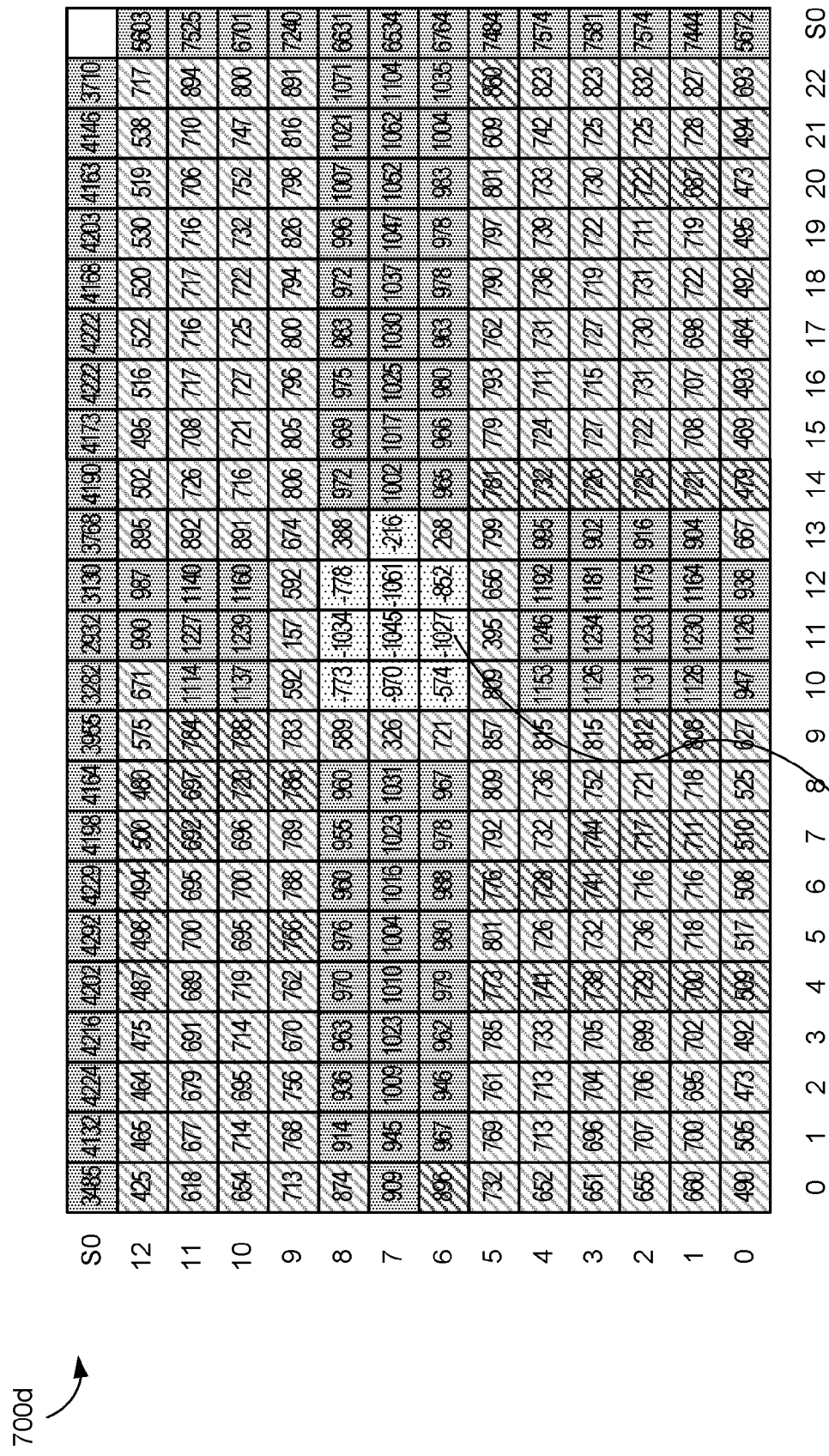

It should be understood that the non-conductive touch does not itself decrease the electrode responses of the touch sensitive display, but instead the displacement of the water causes the decreases electrode responses. In some implementations, the non-conductive touch results in electrode responses at the contact point to substantially equal electrode responses of the original baseline when it displaces water from the touch sensitive display. A model capacitive sense array during a non-conductive touch while in the normalized state 700d is depicted in FIG. 7D. A lighter shaded region (e.g., lighter shaded regions 710, FIG. 7A) in a central portion of the model capacitive sense array indicates a location of a non-conductive touch 714.

Figure 7E:
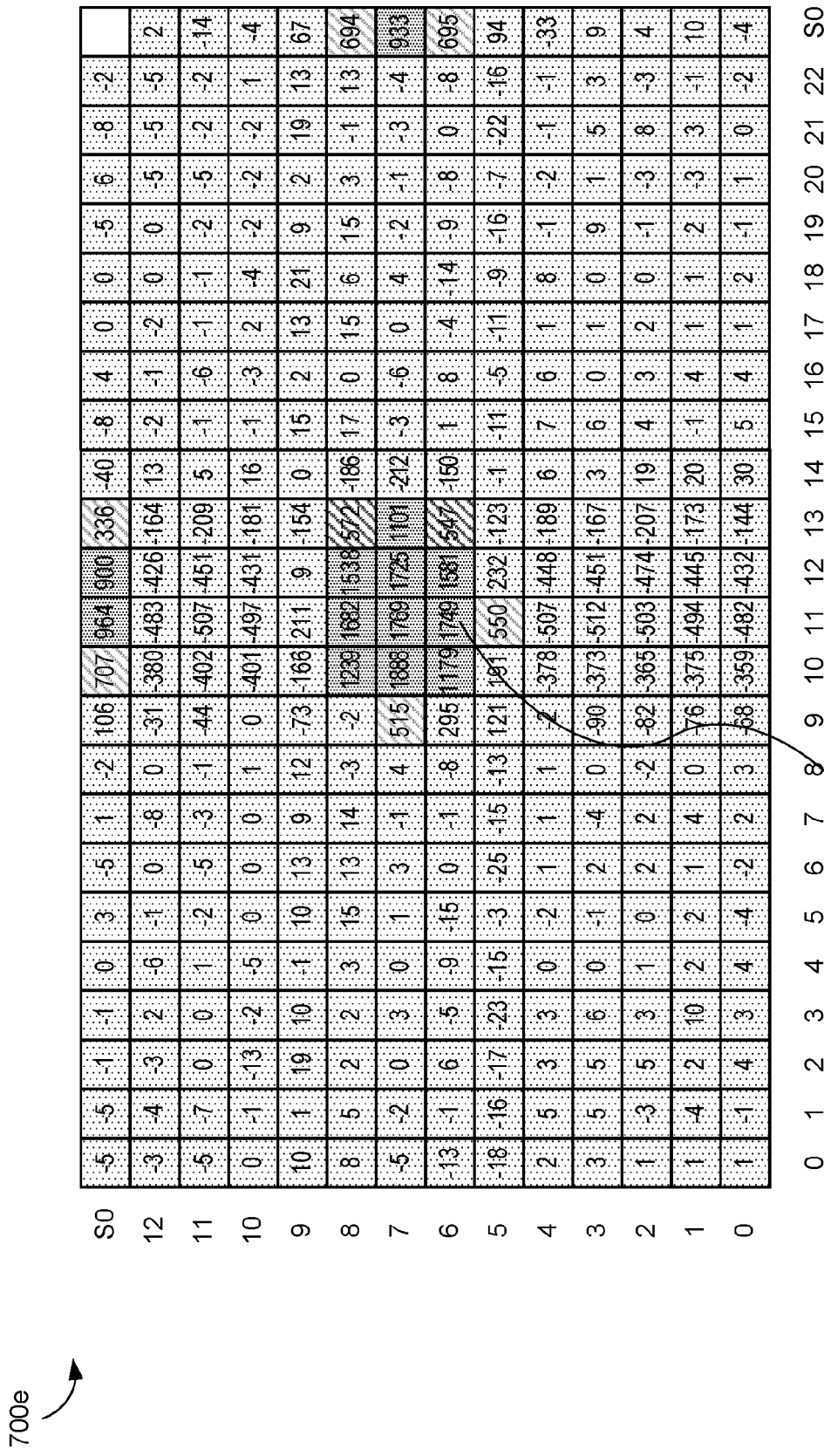

FIG. 4E is a conceptual diagram of the touch sensitive display during a non-conductive touch in an inverted state 400e, in accordance with some implementations (e.g., the electrode responses associated with the non-conducted touch are inverted). A shaded area 412 represents the location of the detected non-conducted touch (e.g., the gloved finger of the diver) on the touch sensitive display. In some implementations, subsequent to detecting the non-conductive touch (i.e., detecting displacement of water resulting from the non-conductive touch) at the location of the touch screen, the processing device inverts the electrode responses associated with the detected non-conductive touch at the location (e.g., the shaded area 412) of the touch screen. In this way, the inverted electrode responses resemble a normal, out-of-water touch. A model capacitive sense array during a non-conductive touch while in the inverted state 700e is depicted in FIG. 7E. A darker shaded region (e.g., darker shaded regions 706, FIG. 7A) in the central portion of the model capacitive sense array indicates a location of the non-conductive touch 714.

In some implementations, the plurality of sensor electrodes includes a first self-capacitance buffer 414 (e.g., TX self-capacitance sensors 408-A and RX self-capacitance sensors 408-B) that stores (i.e., maintains) the increased electrode responses detected from the plurality of sensor electrodes. In other words, the first self-capacitance buffer 414 is not normalized. The first self-capacitance buffer 414 tracks a state of the touch sensitive display. For example, in some implementations, if a majority of the self-capacitance sensors in first self-capacitance buffer 414 measure electrode responses below the predetermined electrode response criterion, then the processing device transitions from the underwater mode back to the ordinary mode.

In some implementations, the plurality of sensor electrodes includes a second self-capacitance buffer 416 that is normalized (e.g., set to zero) after the touch sensitive display transitions to the underwater mode. In some implementations, electrode responses of the capacitive sense array are inverted at the second self-capacitance buffer 416. In some implementations, the second self-capacitance buffer 416 tracks one or more touch locations during submersion of the touch sensitive display.

Figure 7F:
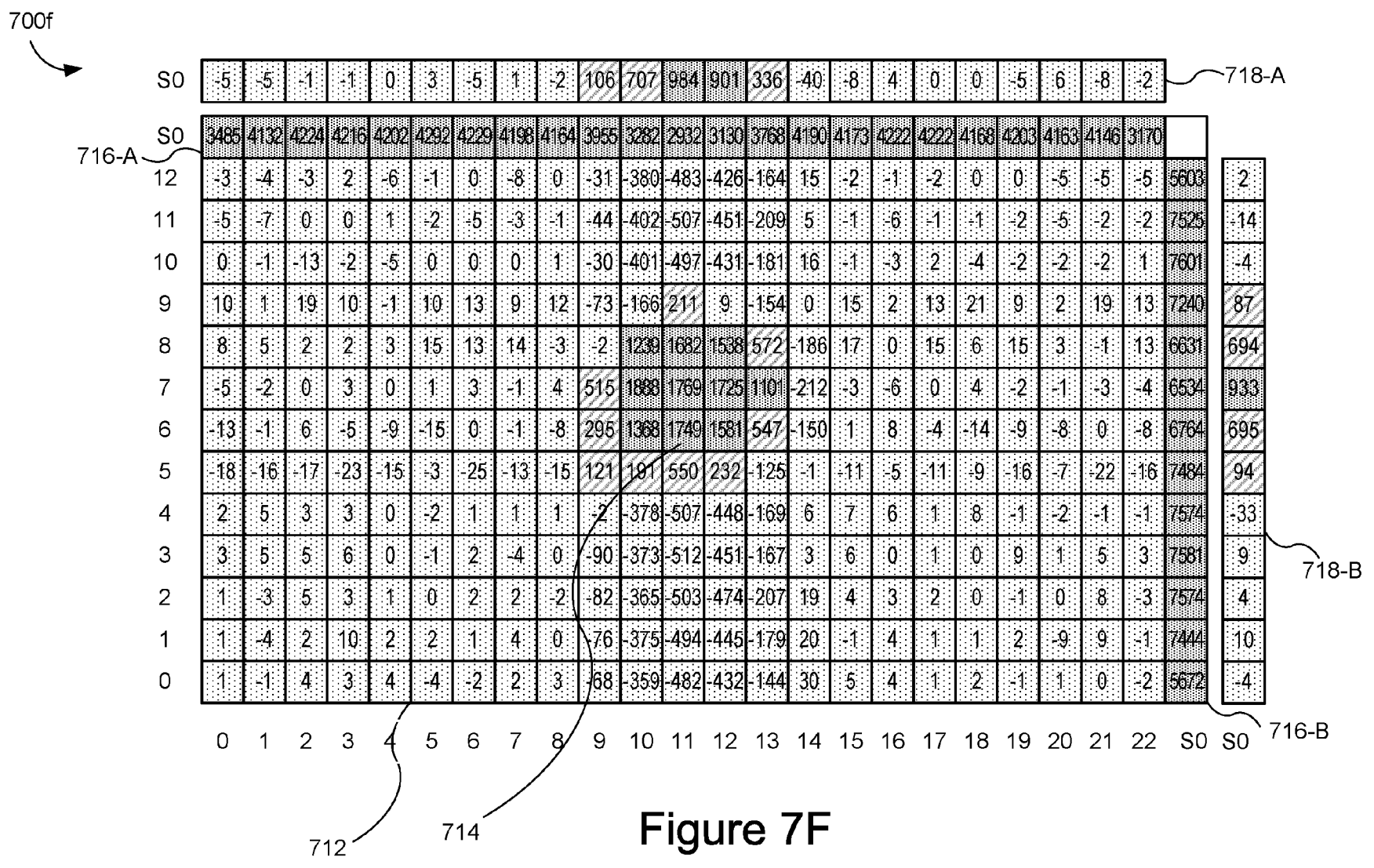

A model capacitive sense array, having a first self-capacitance buffer, a second self-capacitance buffer, and a mutual-capacitance buffer, during a non-conductive touch while in the inverted state 700f is depicted in FIG. 7F. In FIG. 7F, the capacitance sense array is in a normalized state (i.e., the mutual-capacitance buffer 712 is normalized). A non-conductive touch 714 is detected in a center portion of the capacitance sense array. The first self-capacitance buffer 716-A, 716-B is not normalized and therefore electrode response measurements of the first self-capacitance buffer are substantially increased relative to the other electrode responses of the capacitance sense array. The first self-capacitance buffer 716-A, 716-B is used to track a submersion status of the capacitive sense array. The second self-capacitance buffer 718-A, 718-B is normalized and is configured to detect and track non-conductive touches on the capacitive sense array while the capacitive sense array is submerged. In some implementations, the second self-capacitance buffer 718-A, 718-B inverts electrode responses associated with the detected non-conductive touch 714.

Figure 4F:
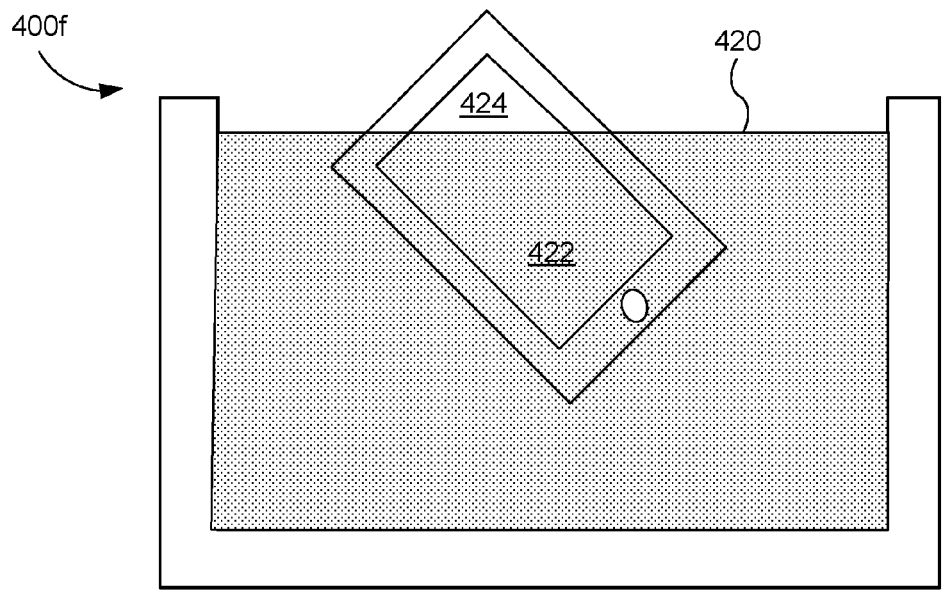
FIGS. 4F-4G are conceptual diagrams of sensor electrode responses during a non-conductive touch tracking operation performed on a touch sensitive display of an electronic device, in accordance with some implementations.
Figure 4G:
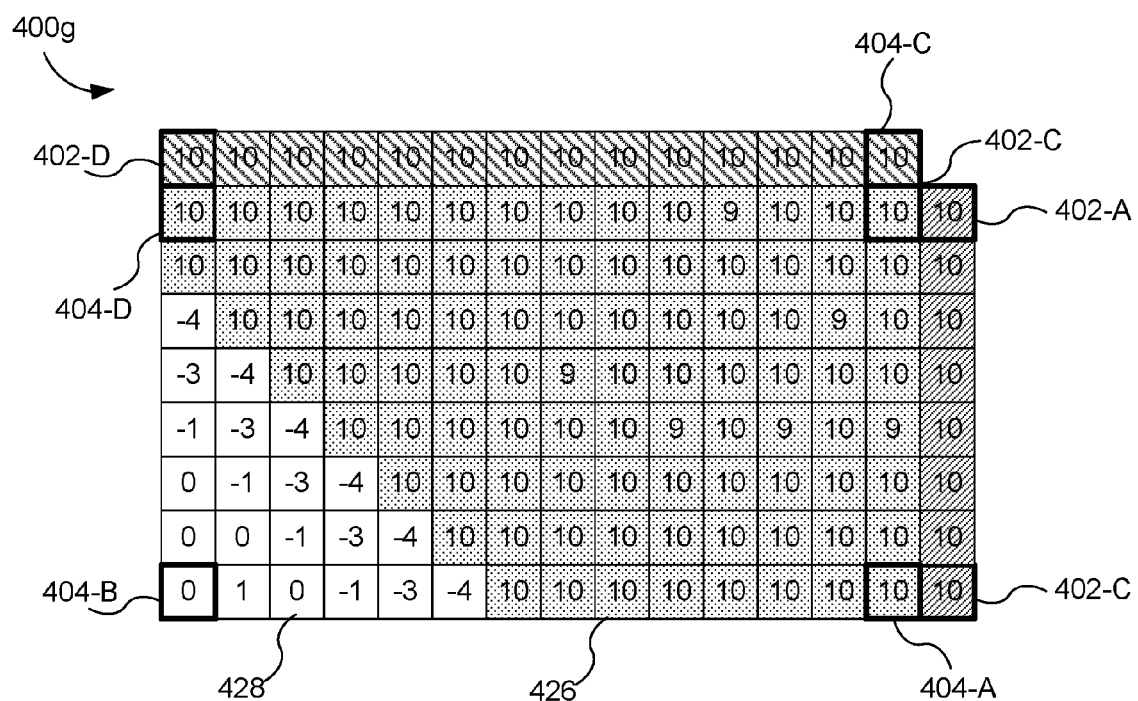

FIGS. 4F-4G are conceptual diagrams of sensor electrode responses during a non-conductive touch tracking operation performed on a touch sensitive display of an electronic device, in accordance with some implementations. In particular, FIGS. 4F-4G show the touch sensitive display in a partially submerged state 400f.

FIG. 4F is a front view of a touch sensitive device (e.g., a mobile phone or a tablet device) in the partially submerged state 400f, in accordance with some implementations. The touch sensitive display (e.g., capacitive sense array 202, FIG. 2) of the touch sensitive device is partially submerged in water 420. In some situations, a first portion 422 of the touch sensitive display is submerged while a second portion 424 is not submerged. Accordingly, the touch sensitive device determines whether to transition: the entire display to underwater mode, a portion of the display to underwater mode, or no portion of the display to underwater mode.

FIG. 4G is a conceptual diagram of the touch sensitive display in the partially submerged state 400f, in accordance with some implementations. A shaded area 426 depicts an area of the touch sensitive display that is submerged (i.e., unshaded area 428 is not submerged). In some implementations, one or more self-capacitance sensors are positioned at different critical detection areas of the touch sensitive display (e.g., 402-A, 402-B, 402-C, and 402-D). The touch sensitive display is assumed to be submerged if each critical positioned self-capacitance sensors is activated. However, in some situations each critically positioned self-capacitance sensor is activated, thereby indicating submersion of the touch sensitive display, when in fact the touch sensitive display is not completely submerged. This situation is depicted in FIGS. 4F-4G.

To combat false activations (i.e., false positives), in some implementations, one or more mutual-capacitance sensors are positioned at different critical detection areas (e.g., corner regions) of the capacitive sense array (e.g., 404-A, 404-B, 4040-C, and 404-D). The one or more mutual-capacitance sensors (e.g., 404-A, 404-B, 404-C, and 404-D) serve as a second line of defense against false positives (i.e., prevent transition to underwater mode when the device is not fully submerged). For example, upon activation of the critically positioned self-capacitance sensors (e.g., 402-A, 402-B, 402-C, and/or 402-D), the device detects for submersion of the one or more mutual-capacitance sensors. In this way, the device double checks for submersion of the touch sensitive display prior to transitioning from the ordinary state 400a to the submerged state 400b. Limiting a scan area to a reduced number of capacitance sensors (e.g., capacitance sensors placed in corners of the touch sensitive display) minimizes overall power consumption of a system (e.g., sensing system 100, FIG. 1). For example, limiting the scan area to the reduced number of capacitance sensors permits a sensing module (e.g., management module 121-1, FIG. 1) to scan for a shorted period of time, thereby reducing power consumption.

Figure 5:
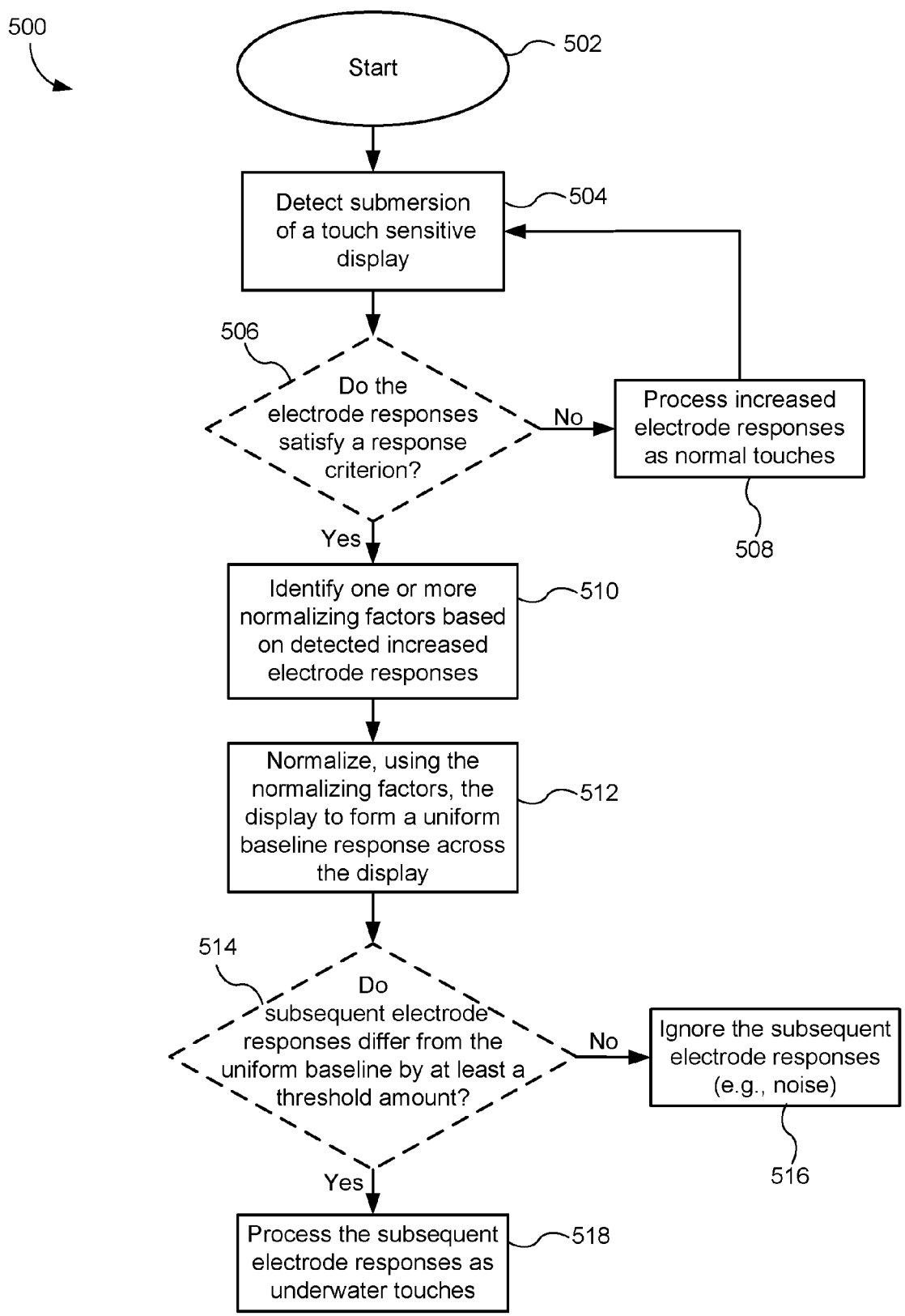
FIG. 5 illustrates a conceptual flowchart representation of a method of detecting submersion of a capacitive sense array, in accordance with some implementations.

FIG. 5 illustrates a conceptual flowchart representation of a method 500 of detecting submersion of a capacitive sense array, in accordance with some implementations. With reference to the sensing system 100 pictured in FIG. 1, in some implementations, a method 500 is performed by a processing device (e.g., processing device 120, FIG. 1) or one or more components of the processing device (e.g., touch controller 124). In some implementations, the method 500 is governed by instructions that are stored in a non-transitory computer-readable storage medium and that are executed by one or more processors of a device (e.g., a touch sensitive device), such as the one or more processing units (CPUs) 122-1 of management module 121-1 (FIG. 1).

In some implementations, some of the operations (or alternatively, steps) of method 500 are performed at a host system (e.g., computer system 110) that is operatively coupled with the processing device 120 and other operations of method 500 are performed at the processing device 120. In some of these implementations, method 500 is governed, at least in part, by instructions that are stored in a non-transitory computer-readable storage medium and that are executed by one or more processors (e.g., computer system 110) of the host system.

For ease of explanation, the following describes method 500 as performed by the processing device (also referred to as touch device or touch sensitive device) (e.g., processing device 120, FIG. 1). With reference to FIG. 3, in some implementations, the operations of method 500 are performed, at least in part, by a scan module (e.g., scan module 312, FIG. 3), a presence module (e.g., presence module 314, FIG. 3), a mode selection module (e.g., mode selection module 316, FIG. 3), and a normalization module (e.g., normalization module 318, FIG. 3) or a program that embodies one or more functions of these modules.

The method begins (502) when the processing device 120 detects (504) submersion of the touch sensitive display (e.g., touch screen 130, FIG. 1 or the capacitive sense array 202, FIG. 2). In some implementations, the processing device 120 detects submersion by detecting increased electrode responses, from at least a portion (e.g., a subset of sensor electrodes) of the capacitive sense array. In some implementations, the processing device 120 detects submersion by detecting a threshold number of sensor electrodes (i.e., a set of sensor electrodes) having increased electrode responses. In some implementations the set of sensor electrodes is the entire array of sensor electrodes (e.g., when the entire sensor array is submerged). In some implementations, the set of sensor electrodes is a contiguous portion of the entire sensor array (e.g., when only a portion of the sensor array is submerged).

In some implementations, the processing device 120 detects increased electrode responses using self-capacitance sensing (e.g., one or more self-capacitance sensors positioned within the touch sensitive display that communicate with the processing device). In some implementations, the one or more self-capacitance sensors are TX self-capacitance sensors (e.g., row sensors 408-A) (also referred to as a self-capacitance buffer) and RX self-capacitance sensors (e.g., column sensors 408-B) (also referred to as a self-capacitance buffer). When using self-capacitance sensing, the processing device detects an added electrode response relative to a baseline at a respective sensor electrode of the plurality of sensor electrodes. Accordingly, the respective sensor electrode is said to be submerged (also referred to as activated) when the added electrode response at the respective sensor electrode exceeds a predetermined electrode response criterion (the predetermined electrode response criterion is discussed below with reference to step 506).

In some implementations, the processing device detects increased electrode responses using mutual-capacitance sensing (e.g., one or more mutual-capacitance sensors positioned within the touch sensitive display communicate with the processing device). In some implementations, the one or more mutual-capacitance is a mutual capacitance buffer (e.g., mutual capacitance buffer 405, FIG. 4A). When using mutual-capacitance sensing, the processing device measures a change in capacitance between a column electrode (e.g., a transmitter (TX) electrode), and a row electrode (e.g., a receiver (RX) electrode). For example, mutual-capacitance between a TX and RX electrode pair changes by an amount when submerged. Accordingly, the TX and RX electrode pair is said to be submerged when the mutual-capacitance between the pair changes by a predetermined electrode response criterion. It should be understood that the predetermined electrode response criterion associated with self-capacitance measurements and the predetermined electrode response criterion associated with mutual-capacitance measurements are in some situations the same, and are in other situations different. Further, in some implementations, the processing device first detects increased electrode responses using self-capacitance sensing, and subsequently detects increased electrode responses using mutual-capacitance sensing, or vice versa.

In some implementations, the processing device detects increased electrode responses at specific areas (e.g., critical detection positions/areas) of the capacitive sense array (e.g., one or more mutual-capacitance sensors and/or one or more self-capacitance sensors positioned within the touch sensitive display communicate with the processing device). In some implementations, one or more capacitance sensors (e.g., self-capacitance sensors or mutual-capacitance sensors) are placed at various critical detection positions within the capacitive sense array. In some implementations, the one or more capacitance sensors (e.g., self-capacitance sensors 402-A, 402-B, 402-C, and 402-D, FIG. 4A) are placed at one or more corners of the capacitive sense array. Accordingly, the one or more critically placed capacitance sensors are said to be submerged when the electrode response associated with each capacitance sensor exceeds a predetermined electrode response criterion. In some situations, placing the one or more capacitance sensors at the various critical detection positions within the capacitive sense array reduces false submersion triggers (e.g., false submersion trigger occurs when the touch sensitive device thinks the capacitive sense array is underwater when in fact it is not).

In some implementations, debounce and/or hysteresis is implemented for the predetermined electrode response criterion. Moreover, in some implementations, debounce and/or hysteresis is implemented for other thresholds described herein.

Next, the processing device determines whether (506) the detected electrode responses satisfy (i.e., exceed) a predetermined electrode response criterion. If the detected electrode response for a respective sensor electrode exceeds the predetermined electrode response criterion, then the respective sensor electrode is counted towards the threshold number of sensor electrodes. In some implementations, the detected electrode responses based on self-capacitance measurements are used to satisfy the predetermined electrode response criterion. In some implementations, the detected electrode responses based on mutual-capacitance measurements are used to satisfy the predetermined electrode response criterion. In some implementations, the detected electrode responses detected at the specific areas (e.g., at the critical detection positions/areas) of the capacitive sense array are used to satisfy the predetermined electrode response criterion. In some implementations, the predetermined electrode response criterion is substantially greater than an electrode response associated with a normal touch (e.g., a common out-of-water touch).

In some implementations, the processing device stores one or more predetermined electrode response criterions. In some implementations, the one or more predetermined electrode response criterions include a first predetermined electrode response criterion associated with self-capacitance measurements and a second predetermined electrode response criterion associated with mutual-capacitance measurements. In some implementations, the one or more predetermined electrode response criterions include a first predetermined electrode response criterion associated with a first water type (e.g., fresh water), and a second predetermined electrode response criterion associated with a second water type (e.g., salt water). In some implementations, the predetermined electrode response criterion is modified (i.e., calibrated) upon satisfaction of one or more calibration criterions. In some implementations, the one or more calibration criterions include calibration upon detecting submersion of the capacitive sense array. For example, a predetermined electrode response criterion based on salt water may be calibrated to compensate for salinity levels in a given water source (e.g., ocean versus a salt lake). In this way, the predetermined electrode response criterion may be lowered, for example, if needed based on the given water source. In some implantations, the one or more calibration criterions are satisfied upon expiration of a time period. In some implementations, the one or more calibration criterions are satisfied after one or more submersion cycles. Calibrating the predetermined electrode response criterion alleviates effects of aging sensor electrodes, or interferences present on the touch sensitive display (e.g., debris or oil).

In accordance with a determination that the increased electrode responses do not exceed the predetermined electrode response criterion (506—No), the processing device processes (508) the increased electrode responses as normal touches (i.e., normal out-of-water touches). For example, a user's hand covering the capacitive sense array increases electrode responses for a portion (or perhaps all) of the plurality of sensor electrodes. The processing device, however, will not detect submersion (i.e., transition to underwater mode) as electrode responses associated with the user's hand typically will not exceed the predetermined electrode response criterion (e.g., the predetermined electrode response criterion is substantially greater than an electrode response associated with a normal touch).

In accordance with a determination that the increased electrode responses do exceed the predetermined response criterion (506—Yes), the processing device identifies (510) one or more normalization factors based on the detected increased electrode responses. Next, the processing device normalizes (512) the touch sensitive display (and in particular, the capacitive sense array) to form a uniform baseline response across the touch sensitive display using the identified one or more normalization factors. In some implementations, the processing device normalizes mutual-capacitance measurements and forms a uniform mutual-capacitance baseline response across the touch sensitive display using the identified one or more normalization factors. In some situations, the capacitive sense array has one or more regions with similar detected electrode responses (e.g., region 1 has an average electrode response of X, region 2 has an average electrode response of Y, and region 3 has an average electrode response of Z). In these situations, the processing device identifies a unique normalizing factor for each of the one or more regions, and applies the identified unique normalizing factor to the appropriate region to create a uniform baseline response (e.g., the processing device divides each detected electrode response in the region 1 by X). In some implementations, the processing device identifies a unique normalizing factor for each sensor electrode (or for each sensor electrode pair) of the plurality of sensor electrodes. As such, the uniform baseline response is established by simply subtracting the unique normalizing factor from each sensor electrode of the plurality of sensor electrodes (i.e., the detected electrode response for each sensor electrode is simply subtracted from itself).

It should be understood that the normalizing operation does erase or alter the detected electrode responses resulting from submersion of the touch sensitive device. Instead, the normalizing operation creates an illusion that the touch sensitive device is operating in an ordinary state, (e.g., ordinary state 400a, FIG. 4A) by forming the uniform baseline response across the touch sensitive display. The illusion allows touch applications, for example, to process subsequent capacitance measurements (e.g., increased electrode responses that occur while the touch sensitive display is submerged) that the touch applications would not otherwise be able to process during submersion of the device.

Next, the processing device determines whether (514) subsequent electrode responses differ from the uniform baseline response by at least a threshold amount (e.g., the processing device determines whether a subsequent electrode response is a non-conductive touch). In some implementations, this is accomplished by detecting a substantial reduction in electrode responses resulting from an absence of water at a location on the capacitive sense array. As discussed above with reference to FIG. 4D, a gloved touch of a diver substantially reduces electrode responses at a touch location (i.e., a point of contact) on the capacitive sense array. The electrode responses are substantially reduced because water is displaced at the point of contact by the gloved touch (i.e., the glove itself does not substantially interact with sensor electrodes). The absence of water causes the electrode responses at the point of contact to reduce. Accordingly, the processing device can differentiate non-conductive touches (e.g., gloved touch) from non-user interactions (e.g., debris in the water) based on the electrode responses at the point of contact.

In some implementations, the threshold amount is substantially similar to the predetermined electrode response criterion. In some implementations, the threshold amount is substantially less than the predetermined electrode response criterion. This may be the case as a non-conductive touch generally will not displace all traces of water at the point of contact. Accordingly, the non-conductive touch, and in turn the resulting electrode response, will still differ from the uniform baseline response by at least the threshold amount when the threshold amount is substantially less than the predetermined electrode response criterion.

In some implementations, the threshold amount is substantially more than the predetermined electrode response criterion. In such circumstances, the threshold amount considers other factors such as light, pressure, capacitance, and the like.

In accordance with a determination that the subsequent electrode responses do not differ from the uniform baseline response by at least the threshold amount (514—No), the processing device ignores (516) the subsequent electrode responses (i.e., the processing device classifies the subsequent electrode responses as insignificant responses (e.g., noise)). In some implementations, the processing device does not transition to ordinary mode (e.g., ordinary state 400a, FIG. 4A) based on noise.

In accordance with a determination that the subsequent electrode responses do differ from the uniform baseline response by at least the threshold amount (514—Yes), the processing device processes (518) the subsequent electrode responses as underwater touches. In some implementations, processing the subsequent electrode responses as underwater touches includes communicating the underwater touches with other components or applications (e.g., computer system 110, FIG. 1). Accordingly, an application executing on the touch sensitive device will receive and process the underwater touches as it would a normal out-of-water touch. In this way, the touch sensitive device continues to use capacitance measurements to operate, thereby minimizing reliance on other less reliable means of touch detection (e.g., pressure sensing or light sensing).

In some implementations, the processing device inverts the subsequent electrode responses (e.g., negative electrode responses are inverted into positive electrode responses relative to the uniform baseline response and vice-versa). In some situations, a touch application is programmed to only recognize positive capacitive measurements. Furthermore, in some implementations, a subsequent electrode response from a non-conductive touch will be substantially negative relative to the uniform baseline response. Consequently, the substantially negative electrode response is inverted so that the substantially negative electrode response is received (e.g., by the touch application executing on the device) as a substantially positive electrode response. In this way, the inverted positive electrode response is processed as if it were a normal, out-of-water touch.

In some implementations, the processing device modifies an inverted electrode response associated with an underwater touch prior to communicating with a host system (e.g., computer system 110, FIG. 1). In some implementations, the processing device reduces the inverted electrode response associated with the underwater touch by an amount in order for the inverted electrode response to mirror a normal, out-of-water touch. In this way, the processing device ensures that capacitance measurements associated with an underwater touch complies with electrode response thresholds of an application executing on the electronic device, if any.

Additional details concerning each of the processing steps for method 500, as well as details concerning additional processing steps, are presented below with reference to FIGS. 6A-6C.

Figure 6B:
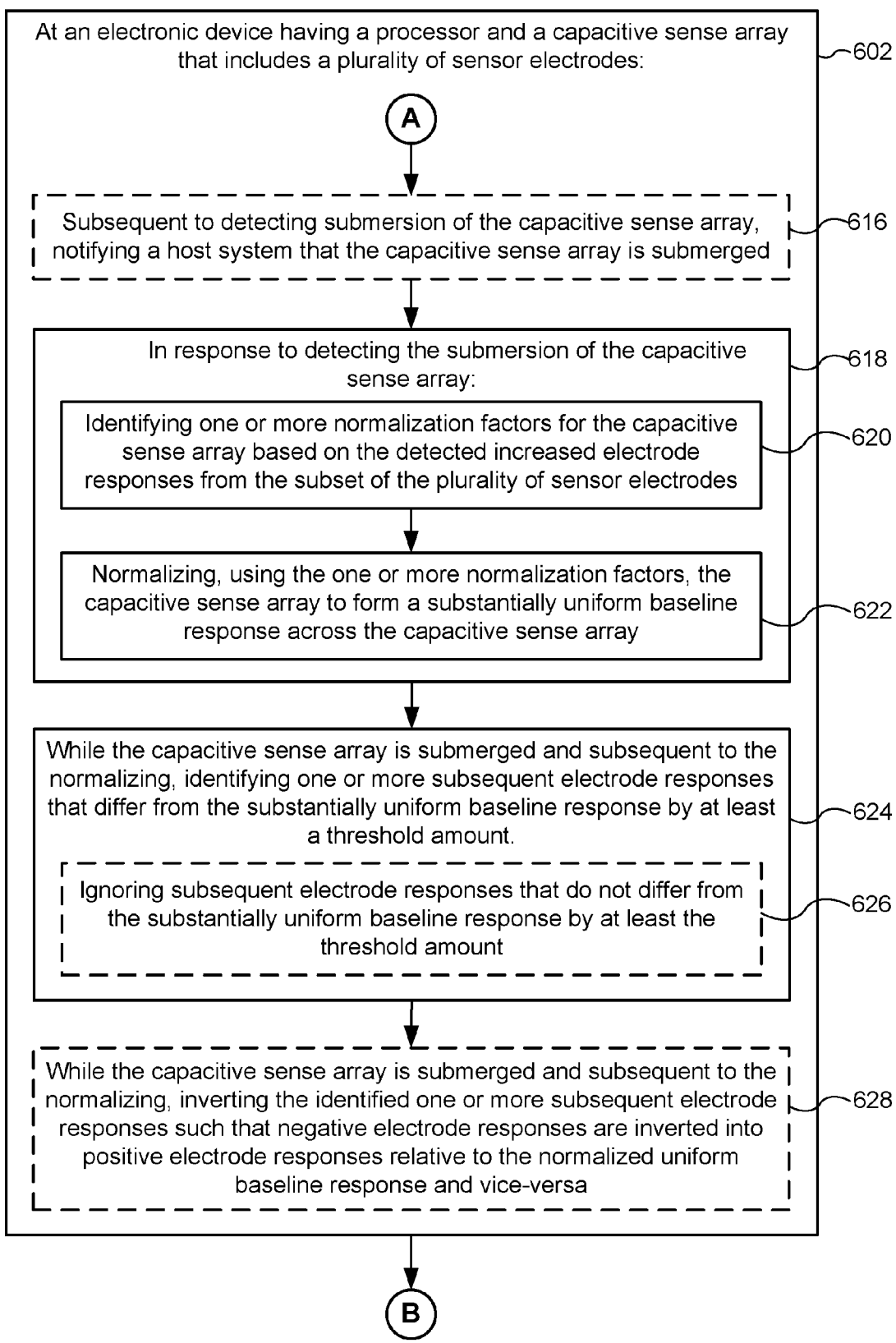
Figure 6C:
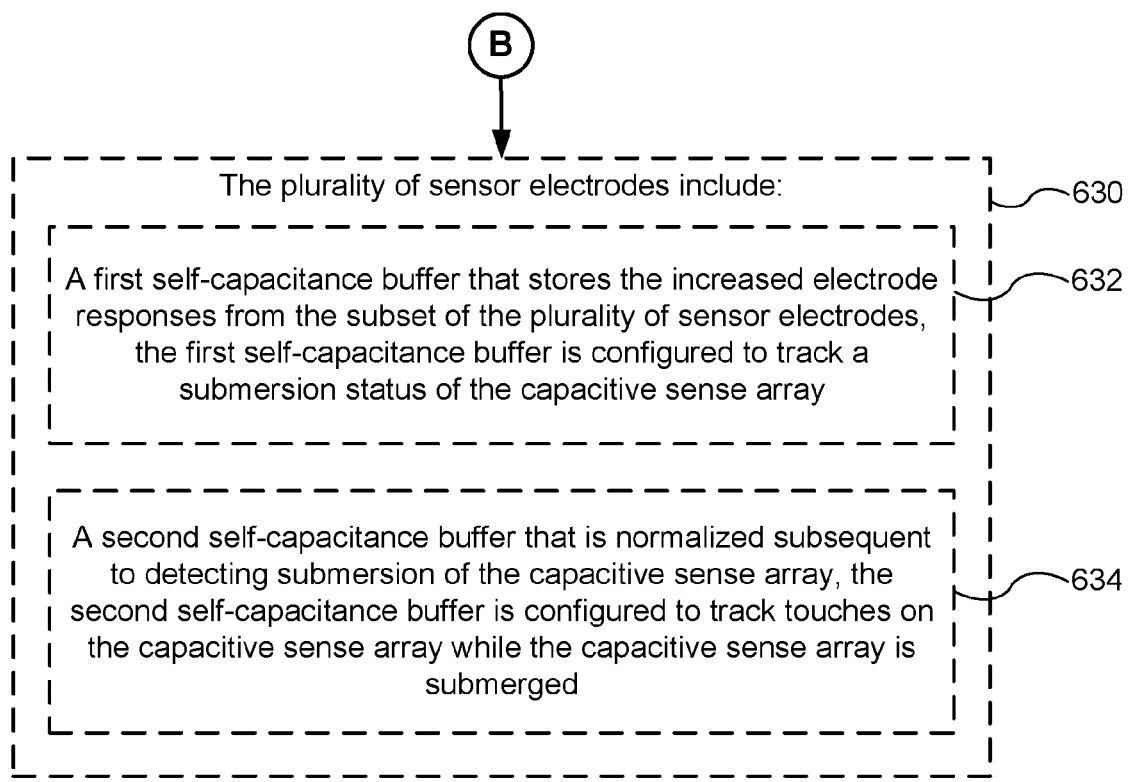

FIGS. 6A-6C illustrate a flowchart representation of a method of detecting submersion of a capacitive sense array, in accordance with some implementations.

With reference to the sensing system 100 pictured in FIG. 1, in some implementations, a method 600 is performed by a processing device (e.g., processing device 120) or one or more components of the processing device (e.g., touch controller 124). In some implementations, the method 600 is governed by instructions that are stored in a non-transitory computer-readable storage medium (e.g., memory 306, FIG. 3) and that are executed by one or more processors of a device, such as the one or more processing units (CPUs) 122-1 of management module 121-1. In some implementations, some of the operations of method 600 are performed at a host system (e.g., computer system 110) that is operatively coupled with the processing device and other operations of method 600 are performed at the processing device. In some implementations, method 600 is governed, at least in part, by instructions that are stored in a non-transitory computer-readable storage medium and that are executed by one or more processors of the host system (the one or more processors of the host system are not shown in FIG. 1).

For ease of explanation, the following describes method 600 as performed by the processing device (e.g., by touch controller 124 of processing device 120, FIG. 1). With reference to FIG. 3, in some implementations, the operations of method 600 are performed, at least in part, by a scan module (e.g., scan module 312, FIG. 3), a presence module (e.g., presence module 314, FIG. 3), a mode selection module (e.g., mode selection module 316, FIG. 3), and a normalization module (e.g., normalization module 318, FIG. 3).

With reference to FIG. 6A, the processing device detects (602) submersion of a capacitive sense array having a plurality of sensor electrodes (e.g., capacitive sense array 202, FIG. 2). In some implementations, detecting submersion of the capacitive sense array includes detecting increased electrode responses from at least a subset of the plurality of sensor electrodes that exceed a predetermined electrode response criterion (604). In some implementations, detecting the increased electrode responses from the subset of the plurality of sensor electrodes that exceed the predetermined electrode response criterion comprises detecting a predefined number of sensor electrodes of the plurality of sensor electrodes having electrode responses that exceed the predetermined electrode response criterion (606) (e.g., detect submersion (i.e., transition the electronic device to an underwater mode) when a predefined number of sensor electrodes have electrode responses that exceed the predetermined electrode response criterion). In some implementations, the predefined number of sensor electrodes includes a percentage (e.g., 50%) of the sensor electrodes in the capacitive sense array; a number of sensor electrodes located in a region (e.g., central portion) of the capacitive sense array; and/or a number of sensor electrodes positioned at different critical detection regions of the capacitive sense array (608) (e.g., a self-capacitance sensor position at each corner of the capacitive sense array).

In some implementations, detecting the increased electrode responses from the subset of the plurality of sensor electrodes that exceed the predetermined electrode response criterion includes detecting a substantially uniform electrode response across the plurality of sensor electrodes (i.e., detecting a substantially uniform electrode response at each of plurality of sensor electrodes) (610). In some implementations, the substantially uniform electrode response includes self-capacitance measurements (e.g., use self-capacitance sensors to measure electrode responses). Thus, in some implementations, if each of the plurality of sensor electrodes exceeds the predetermined electrode response criterion based on self-capacitance, then the capacitive sense array is said to be fully submerged. Detecting submersion of the capacitive sense array is further explained above with reference to FIG. 5.

In some implementations, the predetermined electrode response criterion is greater than an electrode response associated with a non-submerged touch (e.g., a normal out-of-water touch) (612). In some implementations, the predetermined electrode response criterion is a first predetermined electrode response criterion associated with self-capacitance measurements (614). In some implementations, detecting submersion of the capacitive sense array further includes detecting increased mutual-capacitance measurements from at least a subset of the plurality of sensor electrodes (e.g., a predefined group of mutual-capacitance sensors) that exceed a second predetermined electrode response criterion (614). In response to detecting submersion (i.e., activation) of each of the critically positioned self-capacitance sensors, the processing device detects for activation of the predefined group of mutual-capacitance sensors. As with self-capacitance sensors, in some implementations, the predefined group of mutual-capacitance sensors is positioned at different critical detection regions of the capacitive sense array (e.g., corner regions). In some implementations, the second predetermined electrode response criterion is distinct and separate from the first predetermined electrode response criterion. The predetermined electrode response criterion is further explained above with reference to FIG. 5.

In some implementations, with reference to FIG. 6B, subsequent to detecting submersion of the capacitive sense array, the processing device notifies (616) a host system that the capacitive sense array is submerged.

In response to detecting the submersion of the capacitive sense array (618), the processing device identifies (620) one or more normalization factors for the capacitive sense array based on the detected increased electrode responses from the subset of the plurality of sensor electrodes. In some implementations, the normalization factors are based on self-capacitance measurements, and/or mutual-capacitance measurements. Identifying normalization factors are further explained above with reference to FIG. 5.

Furthermore, the processing device normalizes (622), using the one or more normalization factors, the capacitive sense array to form a substantially uniform baseline response across the capacitive sense array. Normalizing the capacitive sense array is further explained above with reference to FIG. 5.

In some implementations, while the capacitive sense array is submerged and subsequent to the normalizing, the processing device identifies (624) one or more subsequent electrode responses that differ from the substantially uniform baseline response by at least a threshold amount. Identifying the subsequent electrode responses is further explained above with reference to FIG. 5.

In some implementations, the processing device ignores (626) subsequent electrode responses that do not differ from the substantially uniform baseline response by at least the threshold amount. Ignoring the subsequent electrode responses is further explained above with reference to FIG. 5.

In some implementations, while the capacitive sense array is submerged and subsequent to the normalizing, the processing device inverts (628) the identified one or more subsequent electrode responses such that negative electrode responses are inverted into positive electrode responses relative to the normalized uniform baseline response and vice-versa. In some implementations, the processing device inverts the subsequent electrode responses prior to communicating with a host system (e.g., computer system 110, FIG. 1). In some implementations, the host system receives the subsequent electrode responses from the processing device, and the host system inverts the subsequent electrode responses. In some implementations, an application executing on the device receives the subsequent electrode responses, and the application inverts the electrode responses. In some implementations, upon detecting submersion of the capacitive sense array and subsequent to normalizing the increased electrode responses, the processing device inverts subsequent mutual-capacitance measurements. Inverting the subsequent electrode responses is further explained above with reference to FIG. 5.

In some implementations, the plurality of sensor electrodes (630) further includes a first self-capacitance buffer (e.g., self-capacitance buffer 414, FIG. 4E) that stores (i.e., maintains) the increased electrode responses from the subset of the plurality of sensor electrodes (632). In other words, the first self-capacitance buffer is not normalized. Instead, the first self-capacitance buffer is configured to track a submersion status of the capacitive sense array. In some implementations, tracking the submersion status of the capacitive sense array includes measuring electrode responses associated with submersion. The processing device transitions to ordinary mode if it detects, via the first self-capacitance buffer, decreased electrode responses from at least the subset of the plurality of sensor electrodes that fall below the predetermined electrode response criterion.

In some implementations, the plurality of sensor electrodes further includes a second self-capacitance buffer (e.g., self-capacitance buffer 416, FIG. 4E) that is normalized subsequent to detecting submersion of the capacitive sense array (634). In some implementations, the second self-capacitance buffer inverts the identified one or more subsequent electrode responses. The second self-capacitance buffer is configured to track touches on the capacitive sense array while the capacitive sense array is submerged. The first and second self-capacitance buffers are further explained above with reference to FIG. 4E.

In some implementations, the plurality of sensor electrodes further includes a mutual-capacitance buffer (e.g., mutual-capacitance buffer 405, FIG. 4A) that is normalized subsequent to detecting submersion of the capacitive sense array. The mutual-capacitance buffer is configured to track touches on the capacitive sense array while the capacitive sense array is submerged.

FIGS. 7A-7F are conceptual diagrams of sensor electrode responses that model a non-conductive touch tracking operation performed on a touch sensitive display of an electronic device, in accordance with some implementations. FIG. 7A shows the touch sensitive display in a partially submerged state 700a. The touch sensitive display includes a mutual-capacitance buffer 702 (e.g., sensor electrodes in rows 0-12 and columns 0-22). The touch sensitive display includes a first self-capacitance buffer 704-A (e.g., sensor electrodes in columns 0-22 and row S0) and a second self-capacitance buffer 704-B (e.g., sensor electrodes in row 0-12 and column S0).

A legend 704 demonstrates the relationships between shaded regions (e.g., darker shaded region 706, middle shaded region 708, and lighter shaded region 710, FIG. 7A) and detected electrode responses. Darker shaded regions 706 represent locations on the touch sensitive display where electrode responses differ from a baseline (e.g., ordinary baseline or uniform normalized baseline) by at least a threshold amount (e.g., predetermined electrode response criterion or the threshold amount associated with electrode responses detected after a normalizing operation). For example, the baseline is say, 0, and the threshold amount is say, 1000. Thus, in some implementations, the darker shaded regions 706 represent sensor electrodes that are submerged (e.g., activated) as each sensor electrode in the darker shaded region 706 has an electrode response (e.g., mutual-capacitance measurement or self-capacitance measurement) that exceeds 900 (as shown in FIG. 7A). In some implementations, the darker shaded regions 706 represent sensor electrodes that are being subjected to a non-conducted underwater touch while in the inverted state (e.g., inverted state 700e, FIG. 7E).

Middle shaded regions 708 represent locations on the touch sensitive display where electrode responses are increased, relative to the baseline (e.g., ordinary baseline or uniform normalized baseline), but the increased electrode responses fail to exceed the threshold amount. In some implementations, the electrode responses that make up the middle shaded region do not exceed the threshold amount even though the sensor electrodes are submerged. For example, middle shaded regions 708-A represent submerged sensor electrodes at the water line. The electrode responses of the submerged sensor electrodes do not exceed the threshold amount because nearby unsubmerged sensor electrodes lower mutual-capacitance measurements of the submerged sensor electrodes. In other circumstances, the electrode responses of the submerged sensor electrodes do not exceed the threshold amount because the threshold amount is calibrated for self-capacitance measurements and not mutual-capacitance measurements, or vice versa. For example, the mutual-capacitance buffer 702 in FIG. 7B is a middle shaded region because the electrode responses that make up the mutual-capacitance buffer 702 of FIG. 7B do not exceed the threshold amount, even though the sensor electrodes of the mutual-capacitance buffer 702 are submerged.

Lighter shaded regions 710 represent locations on the touch sensitive display where electrode responses are substantially similar to or below (e.g., negative responses) the baseline. As such, the lighter shaded regions 710 includes sensor electrodes that are not submerged or sensor electrodes that are being subjected to a non-conducted underwater touch.

It will be understood that the shaded regions (e.g., darker shaded region 706, middle shaded region 708, and lighter shaded region 710, FIG. 7A) are used to demonstrate detected electrode responses in FIGS. 7A-7F.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method, comprising:
   at an electronic device having at least one processor and a capacitive sense array that includes a plurality of sensor electrodes:
   detecting submersion of at least a portion of the capacitive sense array, including detecting increased electrode responses from at least a subset of the plurality of sensor electrodes that exceed a predetermined electrode response criterion;
   normalizing the capacitive sense array to form a substantially uniform baseline response across at least the submerged portion of the capacitive sense array;
   identifying one or more subsequent electrode responses from the submerged portion of the capacitive sense array that differ from the substantially uniform baseline response by at least a threshold amount; and
   inverting the one or more subsequent electrode responses such that negative electrode responses are inverted into positive electrode responses relative to the normalized uniform baseline response and positive electrode responses are inverted into negative electrode responses relative to the normalized uniform baseline response.

2. The method of claim 1, wherein detecting the increased electrode responses from the subset of the plurality of sensor electrodes that exceed the predetermined electrode response criterion comprises detecting a predefined number of sensor electrodes of the plurality of sensor electrodes having electrode responses that exceed the predetermined electrode response criterion.

3. The method of claim 1, further comprising, at the electronic device, positioning one or more capacitance sensors at different critical detection regions of the capacitive sense array.

4. The method of claim 1, wherein detecting the increased electrode responses from the subset of the plurality of sensor electrodes that exceed the predetermined electrode response criterion comprises detecting a substantially uniform electrode response across the plurality of sensor electrodes.

5. The method of claim 1, wherein the plurality of sensor electrodes includes:
   a first self-capacitance buffer that stores the increased electrode responses from the subset of the plurality of sensor electrodes, wherein the first self-capacitance buffer is configured to track a submersion status of the capacitive sense array; and
   a second self-capacitance buffer that is normalized subsequent to detecting submersion of the capacitive sense array, wherein the second self-capacitance buffer is configured to track touches on the capacitive sense array while the capacitive sense array is submerged.

6. The method of claim 1, wherein the predetermined electrode response criterion is a first predetermined electrode response criterion associated with self-capacitance measurements, and wherein detecting submersion of the capacitive sense array further includes detecting increased mutual-capacitance measurements from at least a subset of the plurality of sensor electrodes that exceed a second predetermined electrode response criterion.

7. The method of claim 1, wherein the predetermined electrode response criterion exceeds an electrode response associated with a non-submerged touch.

8. The method of claim 1, subsequent to detecting submersion of the capacitive sense array, the method further comprises, at the electronic device:
   notifying a host system that the capacitive sense array is submerged.

9. The method of claim 1, further comprising, at the electronic device, ignoring subsequent electrode responses that do not differ from the substantially uniform baseline response by at least the threshold amount.

10. The method of claim 1, further comprising, at the electronic device:
identifying one or more normalization factors for the capacitive sense array based on the detected increased electrode responses from the subset of the plurality of sensor electrodes,
wherein the capacitive sense array is normalized using the one or more normalization factors.

11. The method of claim 1, wherein normalizing the capacitive sense array to form the substantially uniform baseline response comprises forming the substantially uniform baseline response across the entire capacitive sense array.

12. A system comprising:
a capacitive sense array that includes a plurality of sensor electrodes; and
a processing device coupled to the capacitive sense array, the processing device configured to:
detect submersion of at least a portion of the capacitive sense array, including detecting increased electrode responses from at least a subset of the plurality of sensor electrodes that exceed a predetermined electrode response criterion;
normalize the capacitive sense array to form a substantially uniform baseline response across at least the submerged portion of the capacitive sense array;
identify one or more subsequent electrode responses from the submerged portion of the capacitive sense array that differ from the substantially uniform baseline response by at least a threshold amount; and
invert the one or more subsequent electrode responses such that negative electrode responses are inverted into positive electrode responses relative to the normalized uniform baseline response and positive electrode responses are inverted into negative electrode responses relative to the normalized uniform baseline response.

13. The system of claim 12, wherein detecting the increased electrode responses from the subset of the plurality of sensor electrodes that exceed the predetermined electrode response criterion comprises detecting a predefined number of sensor electrodes of the plurality of sensor electrodes having electrode responses that exceed the predetermined electrode response criterion.

14. The system of claim 12, wherein the predetermined electrode response criterion is a first predetermined electrode response criterion associated with self-capacitance measurements, and wherein detecting submersion of the capacitive sense array further includes detecting increased mutual-capacitance measurements from at least a subset of the plurality of sensor electrodes that exceed a second predetermined electrode response criterion.

15. The system of claim 12, wherein the predetermined electrode response criterion exceeds an electrode response associated with a non-submerged touch.

16. The system of claim 12, wherein the processing device is further configured to calibrate the predetermined electrode response criterion upon satisfaction of one or more calibration criteria.

17. The system of claim 12, wherein the plurality of sensor electrodes includes:
a first self-capacitance buffer that stores the increased electrode responses from the subset of the plurality of sensor electrodes, wherein the first self-capacitance buffer is configured to track a submersion status of the capacitive sense array; and
a second self-capacitance buffer that is normalized subsequent to detecting submersion of the capacitive sense array, wherein the second self-capacitance buffer is configured to track touches on the capacitive sense array while the capacitive sense array is submerged.

18. A non-transitory computer readable storage medium, storing one or more programs configured for execution by one or more processors of a sensing system, the one or more programs including instructions, which when executed by the one or more processors cause the sensing system to:
detect submersion of at least a portion of a capacitive sense array, including detecting increased electrode responses from at least a subset of a plurality of sensor electrodes of the capacitive sense array that exceed a predetermined electrode response criterion;
normalize the capacitive sense array to form a substantially uniform baseline response across at least the submerged portion of the capacitive sense array;
identify one or more subsequent electrode responses from the submerged portion of the capacitive sense array that differ from the substantially uniform baseline response by at least a threshold amount; and
invert the one or more subsequent electrode responses such that negative electrode responses are inverted into positive electrode responses relative to the normalized uniform baseline response and positive electrode responses are inverted into negative electrode responses relative to the normalized uniform baseline response.

19. The non-transitory computer readable storage medium of claim 18, wherein detecting the increased electrode responses from the subset of the plurality of sensor electrodes that exceed the predetermined electrode response criterion comprises detecting a predefined number of sensor electrodes of the plurality of sensor electrodes having electrode responses that exceed the predetermined electrode response criterion.

20. The non-transitory computer readable storage medium of claim 18, wherein detecting the increased electrode responses from the subset of the plurality of sensor electrodes that exceed the predetermined electrode response criterion comprises detecting a substantially uniform electrode response across the plurality of sensor electrodes.

21. The non-transitory computer readable storage medium of claim 18, wherein the plurality of sensor electrodes includes:
a first self-capacitance buffer that stores the increased electrode responses from the subset of the plurality of sensor electrodes, wherein the first self-capacitance buffer is configured to track a submersion status of the capacitive sense array; and
a second self-capacitance buffer that is normalized subsequent to detecting submersion of the capacitive sense array, wherein the second self-capacitance buffer is configured to track touches on the capacitive sense array while the capacitive sense array is submerged.

22. A method comprising:
at an electronic device having at least one processor and a capacitive sense array that includes a plurality of sensor electrodes:
detecting submersion of at least a portion the capacitive sense array, including detecting increased electrode responses from at least a subset of the plurality of sensor electrodes that exceed a predetermined electrode response criterion;

inverting the increased electrode responses such that positive electrode responses are inverted into negative electrode responses;

normalizing the capacitive sense array to form a substantially uniform baseline response across at least the submerged portion of the capacitive sense array; and identifying one or more subsequent electrode responses from the submerged portion of the capacitive sense array that differ from the substantially uniform baseline response by at least a threshold amount.

* * * * *